US010933759B2

(12) United States Patent
Asano et al.

(10) Patent No.: US 10,933,759 B2
(45) Date of Patent: Mar. 2, 2021

(54) POWER TRANSMISSION SYSTEM, FOREIGN OBJECT DETECTION DEVICE, AND COIL DEVICE

(71) Applicant: IHI CORPORATION, Tokyo (JP)

(72) Inventors: Atsushi Asano, Tokyo (JP); Kentarou Furiya, Tokyo (JP); Jun Araki, Tokyo (JP)

(73) Assignee: IHI CORPORATION, Tokyo (JP)

( * ) Notice: Subject to any disclaimer, the term of this patent is extended or adjusted under 35 U.S.C. 154(b) by 0 days.

(21) Appl. No.: 16/799,442

(22) Filed: Feb. 24, 2020

(65) Prior Publication Data

US 2020/0204006 A1 Jun. 25, 2020

Related U.S. Application Data

(62) Division of application No. 15/543,055, filed as application No. PCT/JP2016/050980 on Jan. 14, 2016, now Pat. No. 10,608,477.

(30) Foreign Application Priority Data

Jan. 19, 2015 (JP) ................................ 2015-007558
Mar. 13, 2015 (JP) ................................ 2015-050347

(51) Int. Cl.
*H02J 50/00* (2016.01)
*H02J 50/60* (2016.01)
(Continued)

(52) U.S. Cl.
CPC ............. *B60L 53/124* (2019.02); *B60L 53/12* (2019.02); *B60L 53/30* (2019.02); *H01F 38/14* (2013.01);
(Continued)

(58) Field of Classification Search
CPC ...................................................... H02J 50/60
See application file for complete search history.

(56) References Cited

U.S. PATENT DOCUMENTS 9,950,636 B2 * 4/2018 Saito ....................... H01F 38/14
2008/0197712 A1 8/2008 Jin et al.
(Continued)

FOREIGN PATENT DOCUMENTS

CN 102638110 A 8/2012
CN 104237954 A 12/2014
(Continued)

OTHER PUBLICATIONS

International Search Report, PCT/JP2016/050980, dated Mar. 15, 2016, 2 pgs. (*previously cited in parent application).

*Primary Examiner* — Daniel Kessie
(74) *Attorney, Agent, or Firm* — Volpe Koenig

(57) ABSTRACT

A foreign object detection device for a coil device including a second coil to transmit power to a first coil wirelessly or receive power from the first coil wirelessly including: a foreign object detection coil configured to be located between the first coil and the second coil; and a cover configured to cover an upper portion of the foreign object detection coil, wherein a top surface of the cover includes at least one inclined surface inclined relative to a coil plane of the second coil, and the inclined surface is inclined downward from a low sensitivity region where detection sensitivity of the foreign object detection coil is relatively lower to a high sensitivity region where the detection sensitivity of the foreign object detection coil is relatively higher.

8 Claims, 33 Drawing Sheets

(51) Int. Cl.
  *B60L 53/124* (2019.01)
  *H02J 7/00* (2006.01)
  *B60L 53/30* (2019.01)
  *B60L 53/12* (2019.01)
  *H02J 50/12* (2016.01)
  *H01F 38/14* (2006.01)
  *H02J 7/02* (2016.01)

(52) U.S. Cl.
  CPC ............... *H02J 7/00* (2013.01); *H02J 50/00* (2016.02); *H02J 50/12* (2016.02); *H02J 50/60* (2016.02); *B60L 2270/147* (2013.01); *H02J 7/025* (2013.01); *Y02T 10/70* (2013.01); *Y02T 10/7072* (2013.01); *Y02T 90/12* (2013.01); *Y02T 90/14* (2013.01)

(56) References Cited

U.S. PATENT DOCUMENTS

| | | | |
|---|---|---|---|
| 2012/0001493 A1 | 1/2012 | Kudo et al. | |
| 2012/0091989 A1 | 4/2012 | Uramoto et al. | |
| 2012/0205988 A1 | 8/2012 | Tanabe | |
| 2013/0069441 A1 | 3/2013 | Verghese et al. | |
| 2013/0169062 A1 | 7/2013 | Maikawa et al. | |
| 2013/0241302 A1 | 9/2013 | Miyamoto et al. | |
| 2013/0264887 A1* | 10/2013 | Arisawa ............... | H02J 7/025 307/104 |
| 2014/0015329 A1 | 1/2014 | Widmer et al. | |
| 2014/0339907 A1 | 11/2014 | Omae et al. | |
| 2015/0084405 A1* | 3/2015 | Koizumi ............... | B60L 53/122 307/9.1 |
| 2015/0200550 A1 | 7/2015 | Maekawa | |
| 2015/0294784 A1 | 10/2015 | Highashiyama et al. | |
| 2015/0311725 A1* | 10/2015 | Yamamoto ............ | G01V 3/101 307/104 |
| 2016/0172891 A1* | 6/2016 | Filippenko ............ | H02J 50/60 320/108 |
| 2016/0254707 A1* | 9/2016 | Fujiwara ............... | B60L 53/126 307/104 |
| 2016/0276875 A1 | 9/2016 | Verghese et al. | |
| 2016/0336760 A1* | 11/2016 | Yamamoto ............ | H02J 50/12 |
| 2016/0336814 A1 | 11/2016 | Miyamoto et al. | |
| 2017/0033615 A1* | 2/2017 | Asanuma ............... | H02J 5/005 |
| 2017/0248726 A1* | 8/2017 | Adachi .................. | H01F 27/28 |

FOREIGN PATENT DOCUMENTS

| | | |
|---|---|---|
| GB | 2508923 A | 6/2014 |
| JP | 2003-258048 A | 9/2003 |
| JP | 2006-013225 A | 1/2006 |
| JP | 2011-250644 A | 12/2011 |
| JP | 2012-016171 A | 1/2012 |
| JP | 2012-090373 A | 5/2012 |
| JP | 2012-249401 A | 12/2012 |
| JP | 2013-034292 A | 2/2013 |
| JP | 2013-046492 A | 3/2013 |
| JP | 2013-135491 A | 7/2013 |
| JP | 2013-192390 A | 9/2013 |
| JP | 2014/013699 A | 1/2014 |
| JP | 2014-027102 A | 2/2014 |
| JP | 2014-039369 A | 2/2014 |
| JP | 2014-073040 A | 4/2014 |
| JP | 2014-096956 A | 5/2014 |
| JP | 2014-526871 A | 10/2014 |
| WO | 2013/189530 A1 | 12/2013 |
| WO | 2014013699 | 1/2014 |

\* cited by examiner

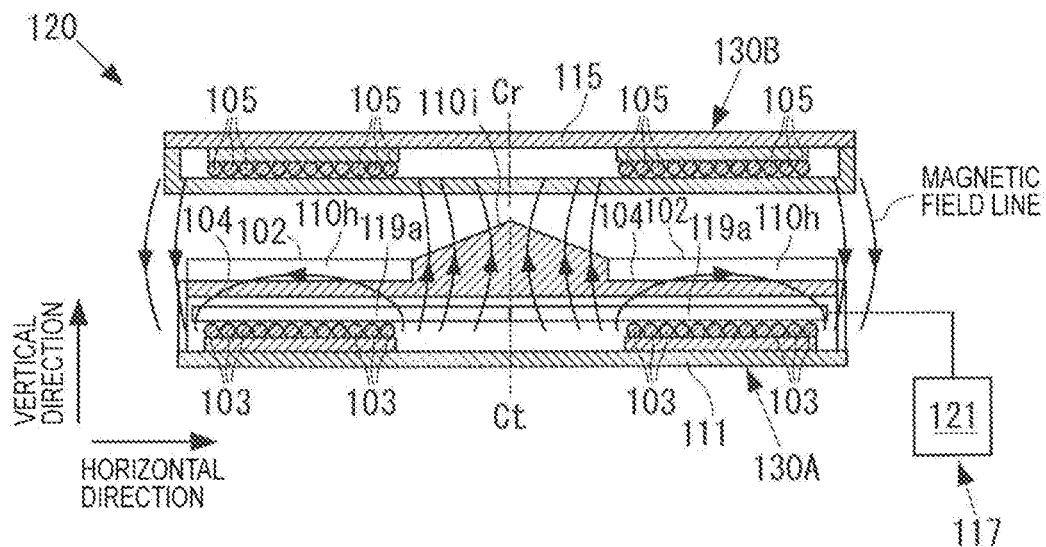
*Fig.29A*
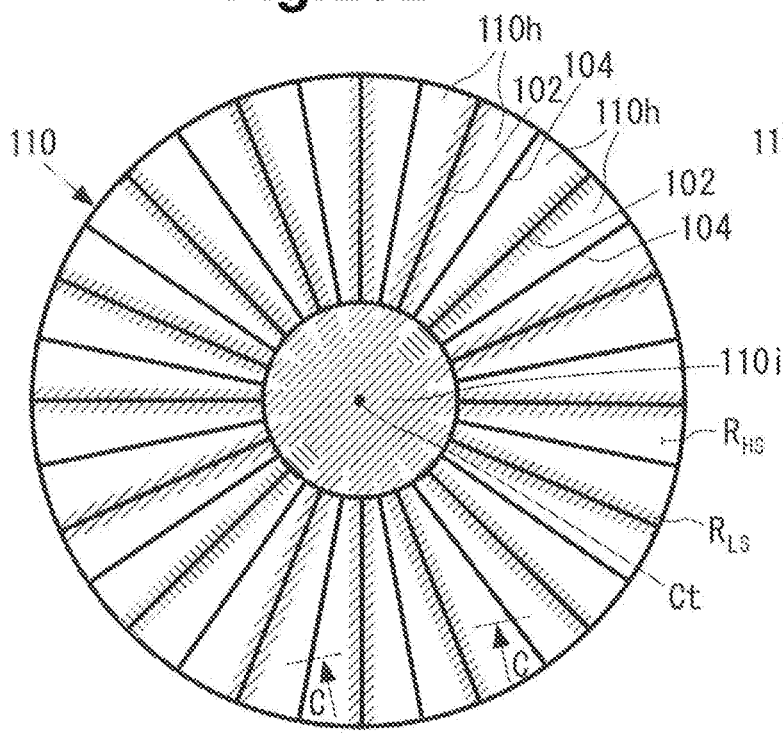
*Fig.29B*
*Fig.29C*

POWER TRANSMISSION SYSTEM, FOREIGN OBJECT DETECTION DEVICE, AND COIL DEVICE

CROSS-REFERENCE TO RELATED APPLICATIONS

This application is a divisional of U.S. application Ser. No. 15/543,055, filed Jul. 12, 2017, which claims priority to Japanese Patent Application No. 2015-007558 filed on Jan. 19, 2015 and the prior Japanese Patent Application No. 2015-050347 filed on Mar. 13, 2015; the entire contents of which are incorporated herein by reference.

TECHNICAL FIELD

The present disclosure relates to a power transmission system, a foreign object detection device, and a coil device.

BACKGROUND ART

A wireless power transfer system includes a power transmission coil device and a power reception coil device and realizes wireless power transmission using electromagnetic induction, magnetic resonance, and the like between coils. As an application example of the wireless power transfer system, there is a power transfer system of an electric vehicle and a plug-in hybrid vehicle. In this case, the power reception coil device is mounted on a vehicle.

In the wireless power transfer system, a power reception coil and a power transmission coil may be arranged vertically with a gap between the power reception coil and the power transmission coil, at the time of wireless power transfer. In this case, because there is the gap between the power transmission coil device and the power reception coil device, a foreign object may enter the gap. Particularly, when a foreign object made of an electrically conductive material such as a coin and an iron nail enters a portion between the power transmission coil device and the power reception coil device, power feeding efficiency may be deteriorated. For this reason, a mechanism for detecting the foreign object entering the portion between the power transmission coil device and the power reception coil device is demanded.

Patent Literature 1 discloses a foreign object detection device in which linear electric wiring lines are arranged in a comb shape to be alternately lined up and it is determined whether there is a foreign object by detecting whether there is a short circuit between the electric wiring lines. Patent Literature 2 discloses a wireless power transfer device (wireless power transfer system) in which a foreign object detection coil is provided between a power transmission coil and a power reception coil and it is determined whether there is a foreign object on the basis of an induced voltage across the foreign object detection coil. The wireless power transfer system of Patent Literature 2 has a configuration of FIG. 32. FIG. 32 is a cross-sectional view along a vertical plane of the wireless power transfer system.

The wireless power transfer system of FIG. 32 includes the power transmission coil 131 and the power reception coil 133, a cover 135, detection loops 137 (detection coils), and a foreign object detection unit 139. Each of the power transmission coil 131 and the power reception coil 133 is formed in a spiral shape in a same plane orthogonal to a plane of paper of FIG. 32. The detection loops 137 are located between the power transmission coil 131 and the power reception coil 133 arranged in a vertical direction as illustrated in FIG. 32. The cover 135 covers the power transmission coil 131 of the lower side and the detection loops 137 from the upper side. The plurality of detection loops 137 are disposed in the plane orthogonal to the plane of paper of FIG. 32. Magnetic flux generated by a current (hereinafter, referred to as a current for power transmission) flowing through the power transmission coil 131 penetrates the detection loops 137. The magnetic flux penetrating the detection loops 137 changes when a foreign object made of an electrically conductive material is placed on a top surface of the cover 135. The foreign object detection unit 139 detects that there is the foreign object on the top surface of the cover 135 by detecting the change. In addition, Patent Literature 3 discloses various shapes of foreign object detection coils.

CITATION LIST

Patent Literature

Patent Literature 1: Japanese Unexamined Patent Publication No. 2006-13225
Patent Literature 2: Japanese Unexamined Patent Publication No. 2012-249401
Patent Literature 3: Japanese Unexamined Patent Publication No. 2014-526871

SUMMARY

Technical Problem

Because the foreign object detection device described in Patent Literature 1 detects the foreign object according to whether there is the short circuit between the electric wiring lines, the foreign object detection device cannot detect a foreign object not contacting two or more electric wiring lines. Meanwhile, in the wireless power transfer device described in Patent Literature 2, the foreign object is detected by the induced voltage due to the change of the magnetic flux through the foreign object detection coil, but the change of the magnetic flux due to the presence of the foreign object may be hard to affect an amount of magnetic flux interlinking with the foreign object detection coil, in a certain position relation of the foreign object detection coil and the foreign object. In this case, the foreign object may not be detected. Hereinafter, positions on the coil device where objects cannot be detected by the foreign object detection coil are called a dead zone. In addition, as in Patent Literature 3, when the foreign object detection coil is formed of twisting of a plurality of loops, there is a dead zone at a boundary between loops adjacent to each other.

FIG. 33 is a diagram illustrating magnetic field lines generated by the current for the power transmission in the wireless power transfer system of FIG. 32. As illustrated in FIG. 33, because the magnetic field lines generated by the current for the power transmission are different according to a position along a horizontal top surface of the cover 135, the magnetic flux (hereinafter, referred to as interlinkage magnetic flux) penetrating the foreign object on the cover 135 is different according to the position thereof. When the interlinkage magnetic flux decreases, disturbance of the magnetic flux by the foreign object decreases. When the foreign object is placed on the top surface of the cover 135 at a position where the interlinkage magnetic flux is smaller, a change amount of the penetration magnetic flux through the detection loops 137 by the foreign object is smaller. Therefore, detection precision of the foreign object is lower.

This is the same even in the case in which the power transmission coil is located at the upper side and the power reception coil is located at the lower side. That is, even in the case in which the cover covering the power reception coil on the lower side from the upper side is provided, detection precision of the foreign object by the detection loop is lower when the foreign object is placed on the top surface of the cover at the position where the interlinkage magnetic flux is smaller.

The present disclosure describes a power transmission system, a foreign object detection device, and a coil device that can improve detection precision of a foreign object.

Solution to Problem

A foreign object detection device according to an aspect of the present disclosure is a foreign object detection device for a coil device including a second coil to transmit power to a first coil wirelessly or receive power from the first coil wirelessly. The foreign object detection device includes a foreign object detection coil configured to be located between the first coil and the second coil and a cover configured to cover an upper portion of the foreign object detection coil. A top surface of the cover includes at least one inclined surface inclined relative to a coil plane of the second coil and the inclined surface is inclined downward from a low sensitivity region where detection sensitivity of the foreign object detection coil is relatively lower to a high sensitivity region where the detection sensitivity of the foreign object detection coil is relatively higher.

A power transmission system according to another aspect of the present disclosure is a power transmission system including a power transmitter including a coil device used for wireless power transfer and a foreign object detection device for the coil device. The power transmission system includes first and second detection coils configured to be disposed on a casing of the coil device, each of the first and second detection coils including two terminals; a selector configured to select one of one terminal of the first detection coil and one terminal of the second detection coil as a first terminal and select one of the other terminal of the first detection coil and the other terminal of the second detection coil as a second terminal; and a controller configured to perform a first foreign object determination process that causes the selector to select the one terminal of the first detection coil as the first terminal and the other terminal of the second detection coil as the second terminal to determine whether there is an electrically conductive foreign object depending on whether connection between the first terminal and the second terminal is in a short circuit state or an open state, and to perform a second foreign object determination process that causes the selector to select the two terminals of the same detection coil from either the first detection coil and the second detection coil as the first terminal and the second terminal to determine whether there is the foreign object depending on a change in an amount of magnetic flux interlinking with the same detection coil.

A foreign object detection device according to another aspect of the present disclosure is a foreign object detection device for a coil device used for wireless power transfer from a power transmitter. The foreign object detection device includes first and second detection coils configured to be disposed on a casing of the coil device, each of the first and second detection coils including two terminals; a selector configured to select one of one terminal of the first detection coil and one terminal of the second detection coil as a first terminal and select one of the other terminal of the first detection coil and the other terminal of the second detection coil as a second terminal; and a controller configured to perform a first foreign object determination process that causes the selector to select the one terminal of the first detection coil as the first terminal and the other terminal of the second detection coil as the second terminal to determine whether there is an electrically conductive foreign object depending on whether connection between the first terminal and the second terminal is in a short circuit state or an open state, and to perform a second foreign object determination process that causes the selector to select the two terminals of the same detection coil from either the first detection coil and the second detection coil as the first terminal and the second terminal to determine whether there is the foreign object depending on a change in an amount of magnetic flux interlinking with the same detection coil.

Effects

According to the present disclosure, detection precision of a foreign object can be improved.

BRIEF DESCRIPTION OF DRAWINGS

FIG. 29A is a diagram illustrating a wireless power transfer system according to a fifth embodiment.

FIG. 29B is a plan view of the cover of FIG. 29A.

FIG. 29C is a cross-sectional view taken along the line C-C of FIG. 29B.

DESCRIPTION OF EMBODIMENTS

[1] Outline of Embodiments

Figure 1:
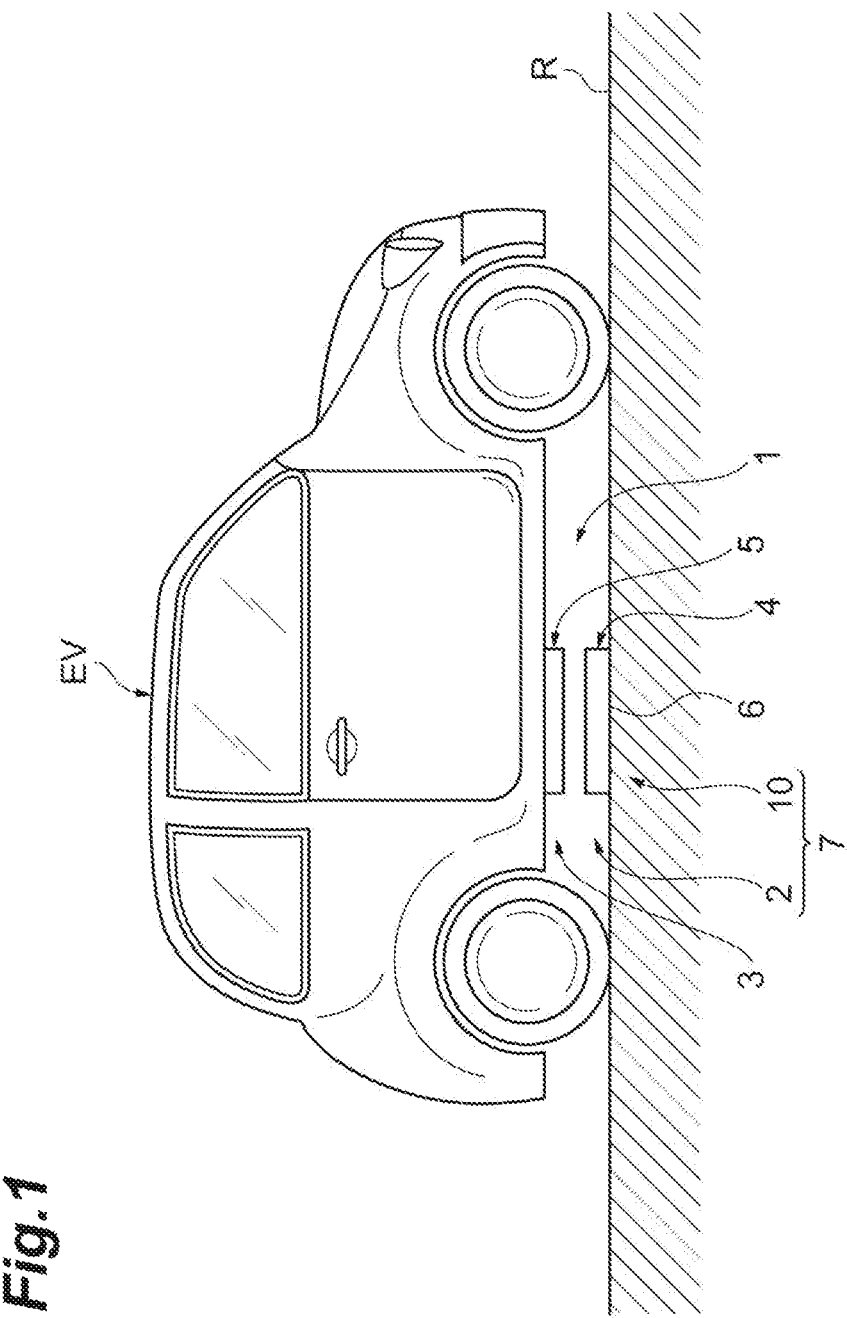
FIG. 1 is a diagram illustrating application examples of a power transmission system, a foreign object detection device, and a coil device according to each embodiment.

A foreign object detection device according to an aspect of the present disclosure is a foreign object detection device for a coil device including a second coil to transmit power to a first coil wirelessly or receive power from the first coil wirelessly. The foreign object detection device includes a foreign object detection coil configured to be located between the first coil and the second coil and a cover configured to cover an upper portion of the foreign object detection coil. A top surface of the cover includes at least one inclined surface inclined relative to a coil plane of the second coil and the inclined surface is inclined downward from a low sensitivity region where detection sensitivity of the foreign object detection coil is relatively lower to a high sensitivity region where the detection sensitivity of the foreign object detection coil is relatively higher.

The top surface of the cover may include an end inclined surface inclined downward and extending to an end of the top surface.

The at least one inclined surface may include a plurality of inclined surfaces of directions different from each other.

The foreign object detection coil may be disposed in parallel to the inclined surface.

The foreign object detection device may further include a vibration device configured to vibrate the cover.

The foreign object detection coil may include a detection loop that is a conductive wire of a loop shape. In this case, the low sensitivity region overlaps the conductive wire when viewed from a direction of a center axis of the detection loop and the high sensitivity region overlaps an inner portion surrounded by the detection loop when viewed from the direction of the center axis of the detection loop.

A coil device according to another aspect of the present disclosure is a coil device including the foreign object detection device and the second coil. In the coil device, the cover further covers the second coil.

According to the present disclosure, because the inclined surface of the cover top surface is inclined downward from the low sensitivity region where the detection sensitivity by the foreign object detection coil is relatively lower to the high sensitivity region where the detection sensitivity by the foreign object detection coil is relatively higher, the foreign object on the inclined surface can be moved to the high sensitivity region by the gravity. Therefore, precision of detection of the foreign object by the foreign object detection coil is improved.

A power transmission system according to another aspect of the present disclosure is a power transmission system including a power transmitter including a coil device used for wireless power transfer and a foreign object detection device for the coil device. The power transmission system includes first and second detection coils configured to be disposed on a casing of the coil device, each of the first and second detection coils including two terminals; a selector configured to select one of one terminal of the first detection coil and one terminal of the second detection coil as a first terminal and select one of the other terminal of the first detection coil and the other terminal of the second detection coil as a second terminal; and a controller configured to perform a first foreign object determination process that causes the selector to select the one terminal of the first detection coil as the first terminal and the other terminal of the second detection coil as the second terminal to determine whether there is an electrically conductive foreign object depending on whether connection between the first terminal and the second terminal is in a short circuit state or an open state, and to perform a second foreign object determination process that causes the selector to select the two terminals of the same detection coil from either the first detection coil and the second detection coil as the first terminal and the second terminal to determine whether there is the foreign object depending on a change in an amount of magnetic flux interlinking with the same detection coil.

According to the power transmission system, the first foreign object determination process in which it is determined whether there is the electrically conductive foreign object according to whether connection between the terminals of the detection coils different from each other is in the short circuit state or the open state is executed and the second foreign object determination process in which there is determined whether there is the electrically conductive foreign object according to the change in the amount of magnetic flux interlinking with the same detection coil is executed. When there is the electrically conductive foreign object in a region surrounded by the first detection coil or the second detection coil, the first detection coil and the second detection coil do not enter the short circuit state. For this reason, in the first foreign object determination process, the above-described foreign object cannot be detected. However, an amount of magnetic flux interlinking with the first detection coil or the second detection coil becomes larger than an amount of magnetic flux interlinking with the first detection coil or the second detection coil when there is not the foreign object. For this reason, even when there is a foreign object not contacting the first detection coil and the second detection coil, the foreign object can be detected by the second foreign object determination process. In addition, when there is the foreign object outside the region surrounded by the first detection coil and the region surrounded by the second detection coil, an amount of magnetic flux interlinking with the first detection coil and the second detection coil is almost the same as an amount of magnetic flux interlinking with the first detection coil and the second detection coil, when there is not the foreign object. For this reason, in the second foreign object determination process, the above-described foreign object cannot be detected. However, when the foreign object contacts the first detection coil and the second detection coil, the terminal of the first detection coil and the terminal of the second detection coil enter the short circuit state. Therefore, the foreign object can be detected by the first foreign object determination process. As a result, detection precision of the foreign object can be improved.

The controller may cause the selector to select the two terminals of the same detection coil as the first terminal and the second terminal and may determine whether there is a failure according to whether the connection between the first terminal and the second terminal is in the short circuit state or the open state. When the two terminals of the same detection coil are in the open state, it is considered that the detection coil is physically disconnected. Therefore, it can be determined that there is the failure. As a result, for example, when it is determined that there is the failure, the foreign object detection process can be caused not to be executed and erroneous detection of the foreign object can be prevented from occurring due to disconnection of the detection coil.

The casing may include a cover and a base defining an accommodation space to accommodate the coil device. The selector may include a plurality of input terminals and each of the plurality of input terminals may correspond to one of the terminals of the first detection coil and the second detection coil. The first detection coil and the second detection coil may be provided in the cover and each terminal of the first detection coil and the second detection coil may be electrically connected to the input terminal corresponding to each terminal by the cover being attached to the base. According to this configuration, when the cover is correctly attached to the base, each terminal of the first detection coil and the second detection coil is electrically connected to the input terminal corresponding to each terminal. Meanwhile, when the cover is not correctly attached to the base, each terminal of the first detection coil and the second detection coil is not electrically connected to the input terminal corresponding to each terminal. For this reason, when the detection coil is not physically disconnected and the cover is correctly attached to the base, the connection between the two terminals of the same detection coil enters the short circuit state. When the detection coil is physically disconnected or the cover is not correctly attached to the base, the two terminals of the same detection coil enter the open state. Therefore, when the two terminals of the same detection coil are in the open state, it is considered that the detection coil is physically disconnected or the cover is not correctly attached to the base. For this reason, it can be determined that there is the failure. As a result, for example, when it is determined that there is the failure, a user can be notified of that the cover is not correctly attached to urge the cover to be correctly attached to the base and the coil device can be suppressed from failing due to a deviation of the cover.

The controller may control the power transmitter such that power feeding for wireless power transfer is prohibited, when it is determined that there is the failure. When it is determined that there is the failure, it is considered that the detection coil is physically disconnected or the cover is not correctly attached to the base. In this case, the foreign object detection device may not detect the foreign object accurately. For this reason, when it is determined that there is the failure, power feeding for the wireless power transfer is prohibited, so that the wireless power transfer in a state in which detection of the foreign object is not normally performed can be suppressed. If the cover is not correctly attached to the base and the dust and the water enter the coil device from the outside, a circuit in the coil device may fail. For this reason, when it is determined that there is the failure, power feeding for the wireless power transfer is prohibited, so that the wireless power transfer in a state in which the circuit does not function normally can be suppressed.

The controller may control the power transmitter such that power feeding for wireless power transfer is prohibited or lower power than at the time of the wireless power transfer is fed, when it is determined that there is the electrically conductive foreign object.

The foreign object detection device may include the first detection coil, the second detection coil, and the selector, and the power transmitter may include the controller. Even in this configuration, detection precision of the foreign object can be improved.

The foreign object detection device may include the first detection coil, the second detection coil, the selector, and the controller. Even in this configuration, detection precision of the foreign object can be improved.

A foreign object detection device according to another aspect of the present disclosure is a foreign object detection device for a coil device used for wireless power transfer from a power transmitter. The foreign object detection device includes first and second detection coils configured to be disposed on a casing of the coil device, each of the first and second detection coils including two terminals; a selector configured to select one of one terminal of the first detection coil and one terminal of the second detection coil as a first terminal and select one of the other terminal of the first detection coil and the other terminal of the second detection coil as a second terminal; and a controller configured to perform a first foreign object determination process that causes the selector to select the one terminal of the first detection coil as the first terminal and the other terminal of the second detection coil as the second terminal to determine whether there is an electrically conductive foreign object depending on whether connection between the first terminal and the second terminal is in a short circuit state or an open state, and to perform a second foreign object determination process that causes the selector to select the two terminals of the same detection coil from either the first detection coil and the second detection coil as the first terminal and the second terminal to determine whether there is the foreign object depending on a change in an amount of magnetic flux interlinking with the same detection coil.

According to the foreign object detection device, the first foreign object determination process in which it is determined whether there is the electrically conductive foreign object according to whether connection between the terminals of the detection coils different from each other is in the short circuit state or the open state is executed and the second foreign object determination process in which there is determined whether there is the electrically conductive foreign object according to the change in the amount of magnetic flux interlinking with the same detection coil is executed. When there is the electrically conductive foreign object in a region surrounded by the first detection coil or the second detection coil, the first detection coil and the second detection coil do not enter the short circuit state. For this reason, in the first foreign object determination process, the above-described foreign object cannot be detected. However, an amount of magnetic flux interlinking with the first detection coil or the second detection coil becomes larger than an amount of magnetic flux interlinking with the first detection coil or the second detection coil, when there is not the foreign object. For this reason, even when there is a foreign object not contacting the first detection coil and the second detection coil, the foreign object can be detected by the second foreign object determination process. In addition, when there is the foreign object outside the region surrounded by the first detection coil and the region surrounded by the second detection coil, an amount of magnetic flux interlinking with the first detection coil and the second detection coil is almost the same as an amount of magnetic flux interlinking with the first detection coil and the second detection coil, when there is not the foreign object. For this reason, in the second foreign object determination process, the above-described foreign object cannot be detected. However, when the foreign object contacts the first detection coil and the second detection coil, the terminal of the first detection coil and the terminal of the second detection coil enter the short circuit state. Therefore, the foreign object can be detected by the first foreign object determination process. As a result, detection precision of the foreign object can be improved.

[2] Examples of Embodiments

Hereinafter, embodiments of the present disclosure will be described with reference to the drawings. In description of the drawings, the same elements are denoted with the same reference numerals and overlapped explanation is omitted.

FIG. 1 is a diagram illustrating an application example of a power transmission system, a foreign object detection device, and a coil device according to each embodiment. As illustrated in FIG. 1, a wireless power transfer system 1 is a system that includes a power transmitter 2 and a power receiver 3 and feeds power from the power transmitter 2 to the power receiver 3. The wireless power transfer system 1 is configured to supply power to an electric vehicle EV arriving at a parking lot or the like, using inter-coil magnetic coupling such as a magnetic field resonance method and an electromagnetic induction method.

The power transmitter 2 is a device that feeds power for wireless power transfer. The power transmitter 2 generates desired alternating-current power from a direct-current power source or an alternating-current power source and transmits the alternating-current power to the power receiver 3. The power transmitter 2 is disposed on a road surface R such as the parking lot, for example. The power transmitter 2 includes a power transmission coil device 4 that is provided to protrude upward from the road surface R such as the parking lot, for example. The power transmission coil device 4 is a coil device for power transmission and has a shape of a flat frustum or a shape of a rectangular parallelepiped, for example. The power transmitter 2 further includes a control unit 16 (refer to FIG. 2), an inverter, and the like (not illustrated in the drawings) and generates the desired alternating-current power from the direct-current power source or the alternating-current power source. The generated alternating-current power is transmitted to the power transmission coil device 4 and the power transmission coil device 4 generates magnetic flux.

The power transmission coil device 4 includes a power transmission coil portion (not illustrated in the drawings) of a flat plate shape to generate the magnetic flux and a housing 6 (casing) to accommodate the power transmission coil portion. The housing 6 has a shape of a flat frustum or a shape of a rectangular parallelepiped and includes a base 61 fixed on the road surface R and a protection cover 62 (cover) fixed on the base 61 and defining an accommodation space V between the base 61 and the protection cover 62, for example (refer to FIG. 3). The base 61 and the protection cover 62 are made of a resin, for example. The base 61 may be realized by a non-magnetic or electrically conductive material (for example, aluminum).

The power receiver 3 is a device that receives power from the power transmitter 2 and feeds the power to a load (for example, a battery). The power receiver 3 is mounted on an electric vehicle EV, for example. The power receiver 3 includes a power reception coil device 5 attached to a bottom surface of a vehicle body (chassis, etc.) of the electric vehicle EV, for example. The power reception coil device 5 is a coil device for power reception and faces the power transmission coil device 4 in a state in which the power reception coil device 5 and the power transmission coil device 4 are separated from each other in a vertical direction, at the time of feeding power. The power reception coil device 5 has a shape of a flat frustum or a shape of a rectangular parallelepiped, for example. The power receiver 3 further includes a controller, a rectifier, etc. (not illustrated in the drawings). The magnetic flux generated by the power transmission coil device 4 interlinks with the power reception coil device 5, so that the power reception coil device 5 generates an induced current. As a result, the power reception coil device 5 receives power from the power transmission coil device 4 wirelessly. The power received by the power reception coil device 5 is fed to the load (for example, the battery).

The wireless power transfer system 1 further includes a foreign object detection device 10. The foreign object detection device 10 is a foreign object detection device for a coil device that is used for wireless power transfer from the power transmitter 2 and is a device that detects a foreign object entering a portion between the power transmission coil device 4 and the power reception coil device 5. The foreign object of the detection target is an electrically conductive foreign object and is a coin, an iron nail, and the like, for example. The foreign object detection device 10 is provided in the power transmitter 2, for example. The power transmitter 2 and the foreign object detection device 10 configure a power transmission system 7.

First Embodiment

Figure 2:
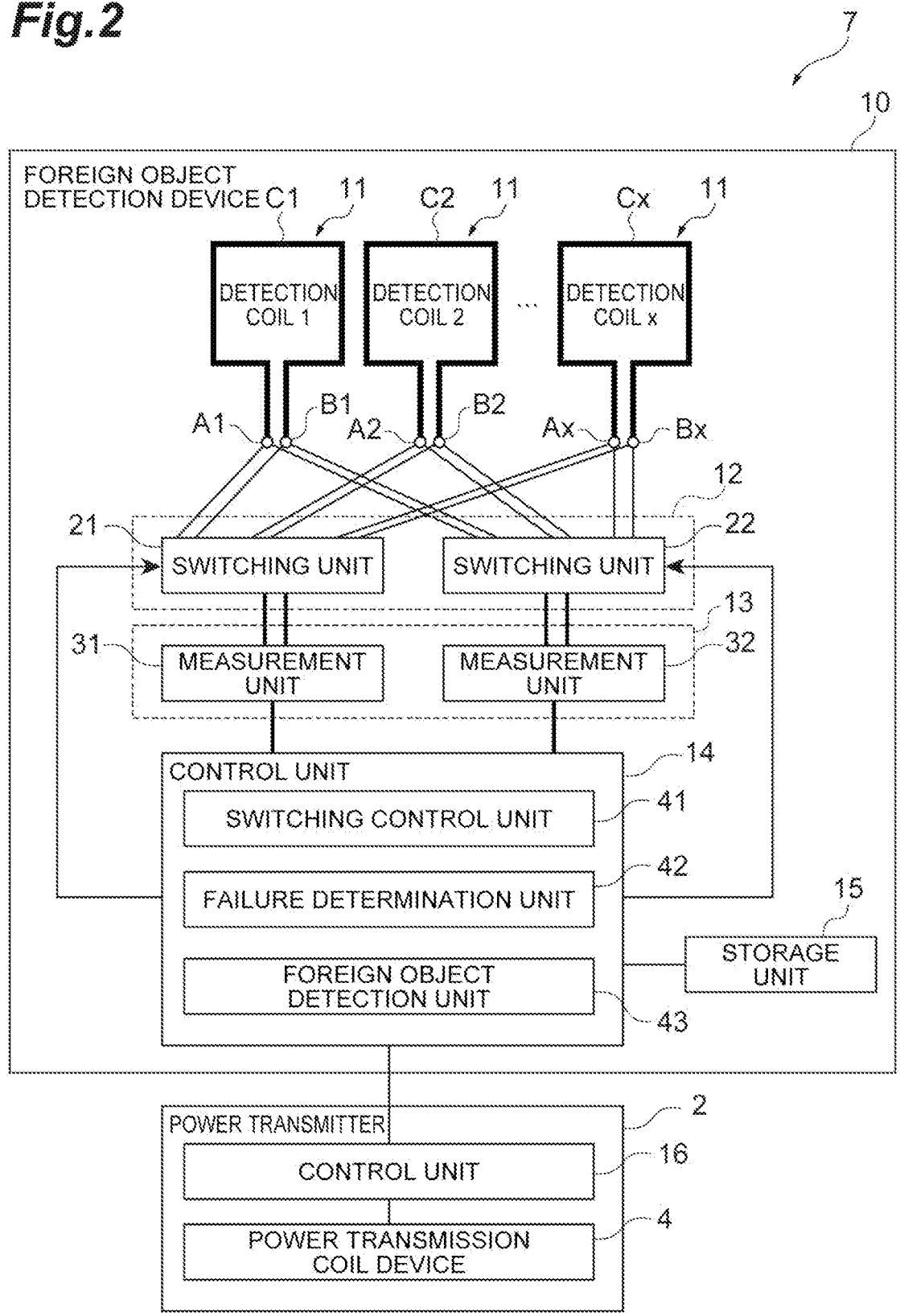
FIG. 2 is a diagram illustrating a functional configuration of a power transmission system according to a first embodiment.
Figure 3:
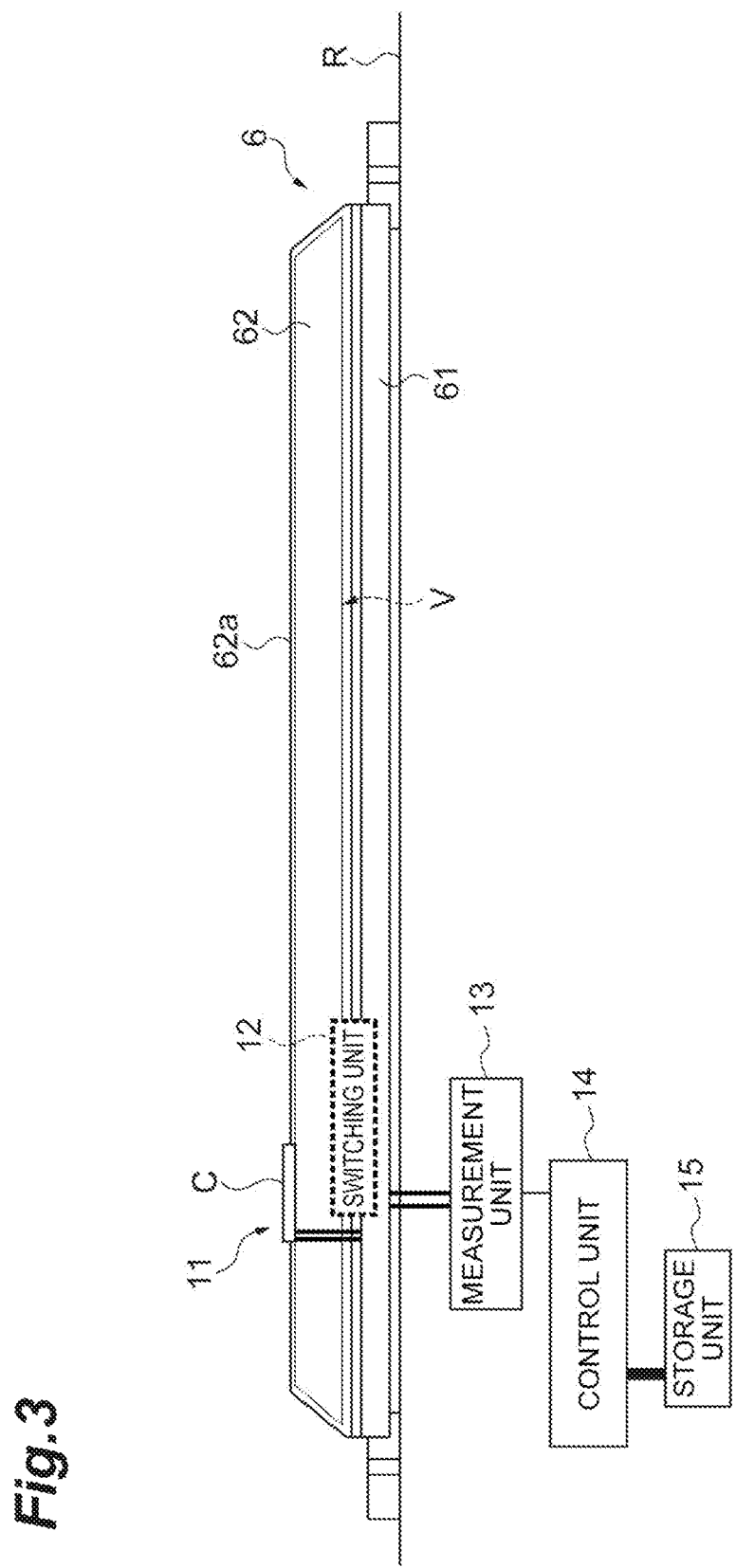
FIG. 3 is a diagram illustrating an arrangement example of components of a foreign object detection device of FIG. 2.
Figure 4:
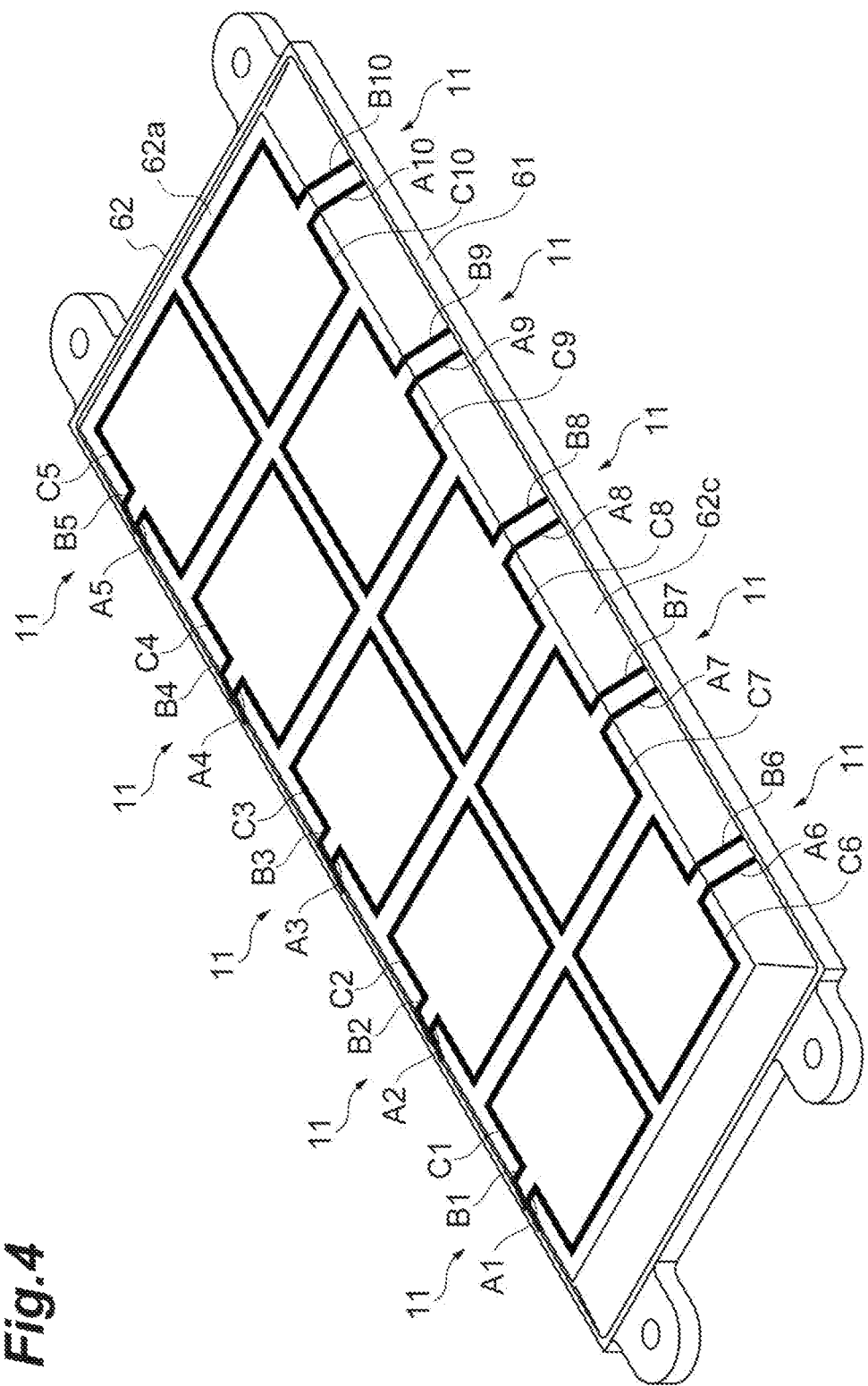
FIG. 4 is a diagram illustrating an arrangement example of detection coils of a foreign object detection device of FIG. 2.
Figure 5A:
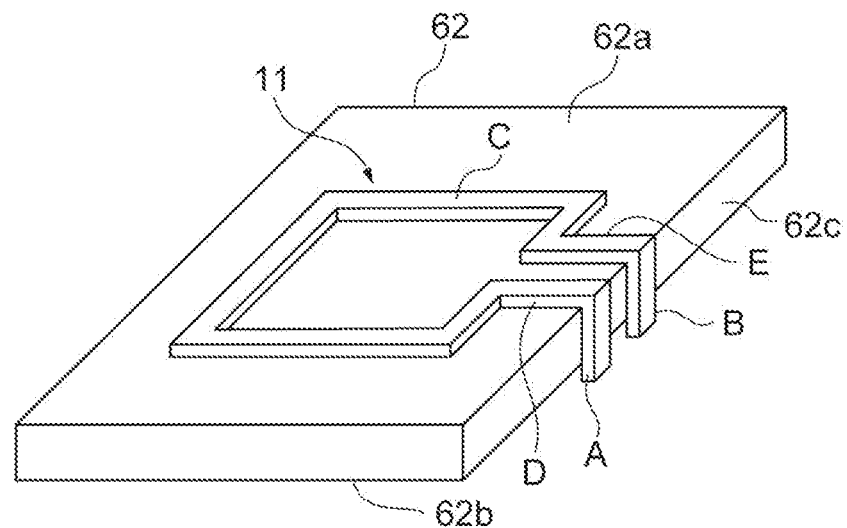
FIG. 5A is a diagram illustrating a wiring example of detection coils of FIG. 4.
Figure 5B:
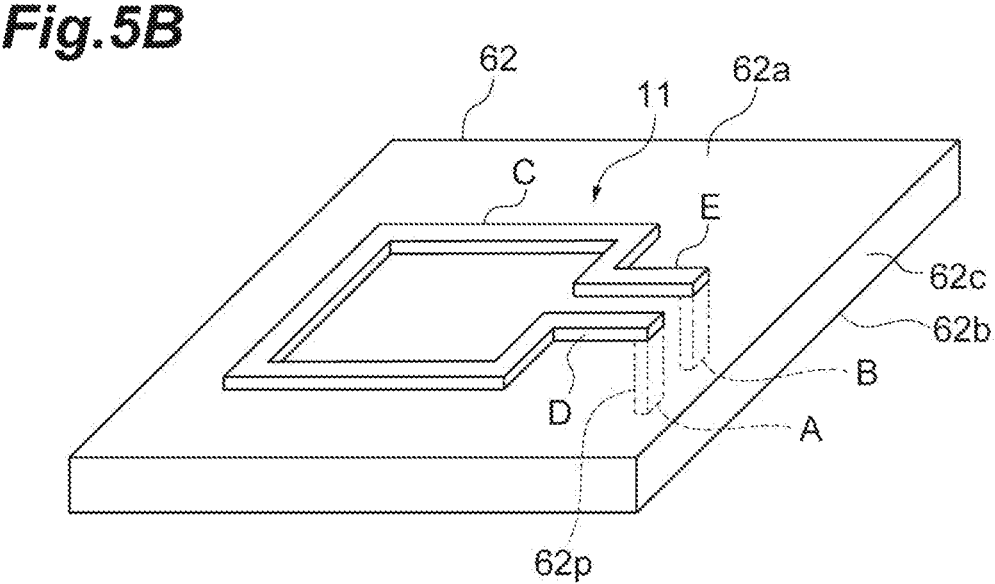
FIG. 5B is a diagram illustrating another wiring example of detection coils of FIG. 4.
Figure 6:
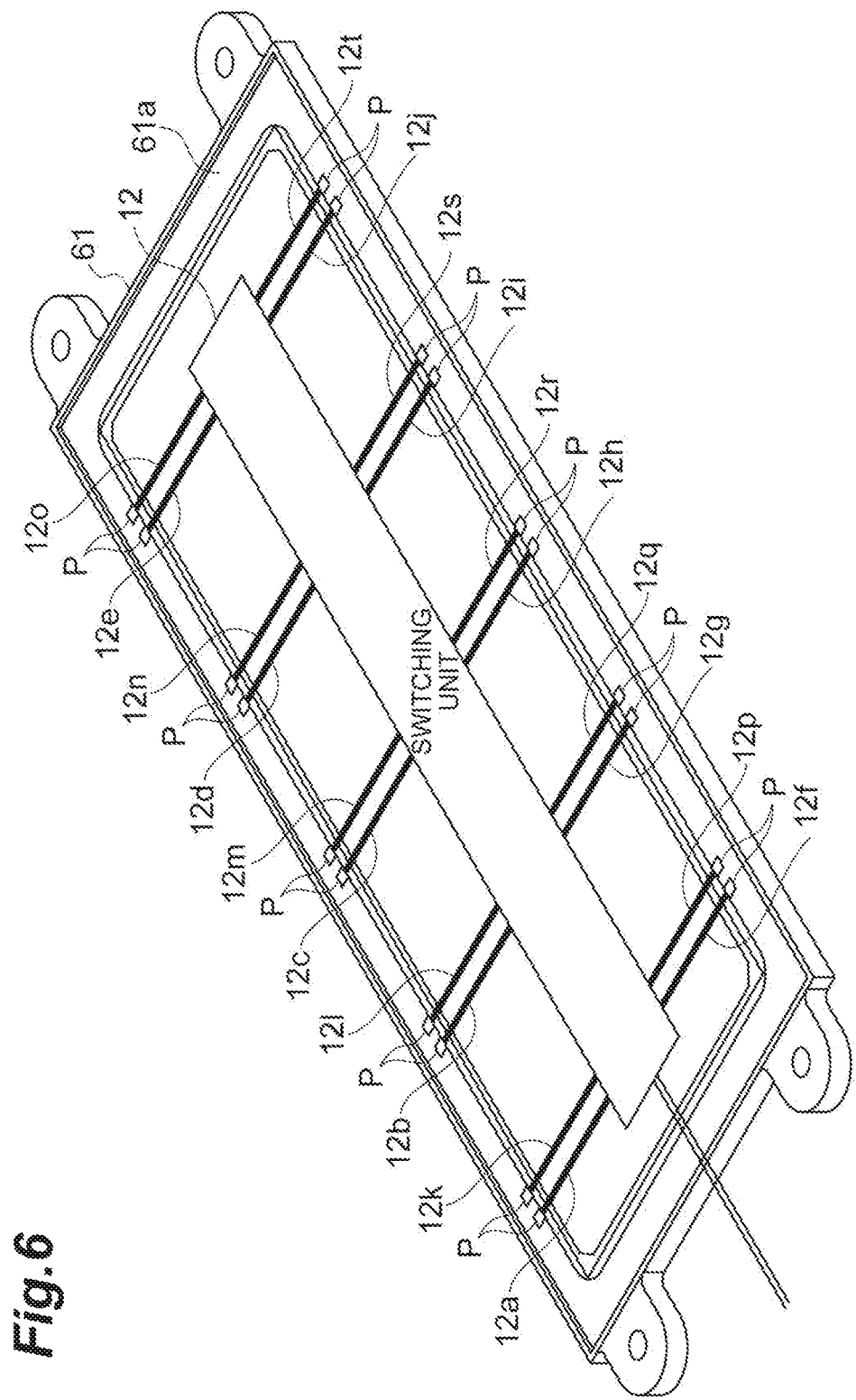
FIG. 6 is a diagram illustrating an arrangement example of a switching unit of a foreign object detection device of FIG. 2.
Figure 7:
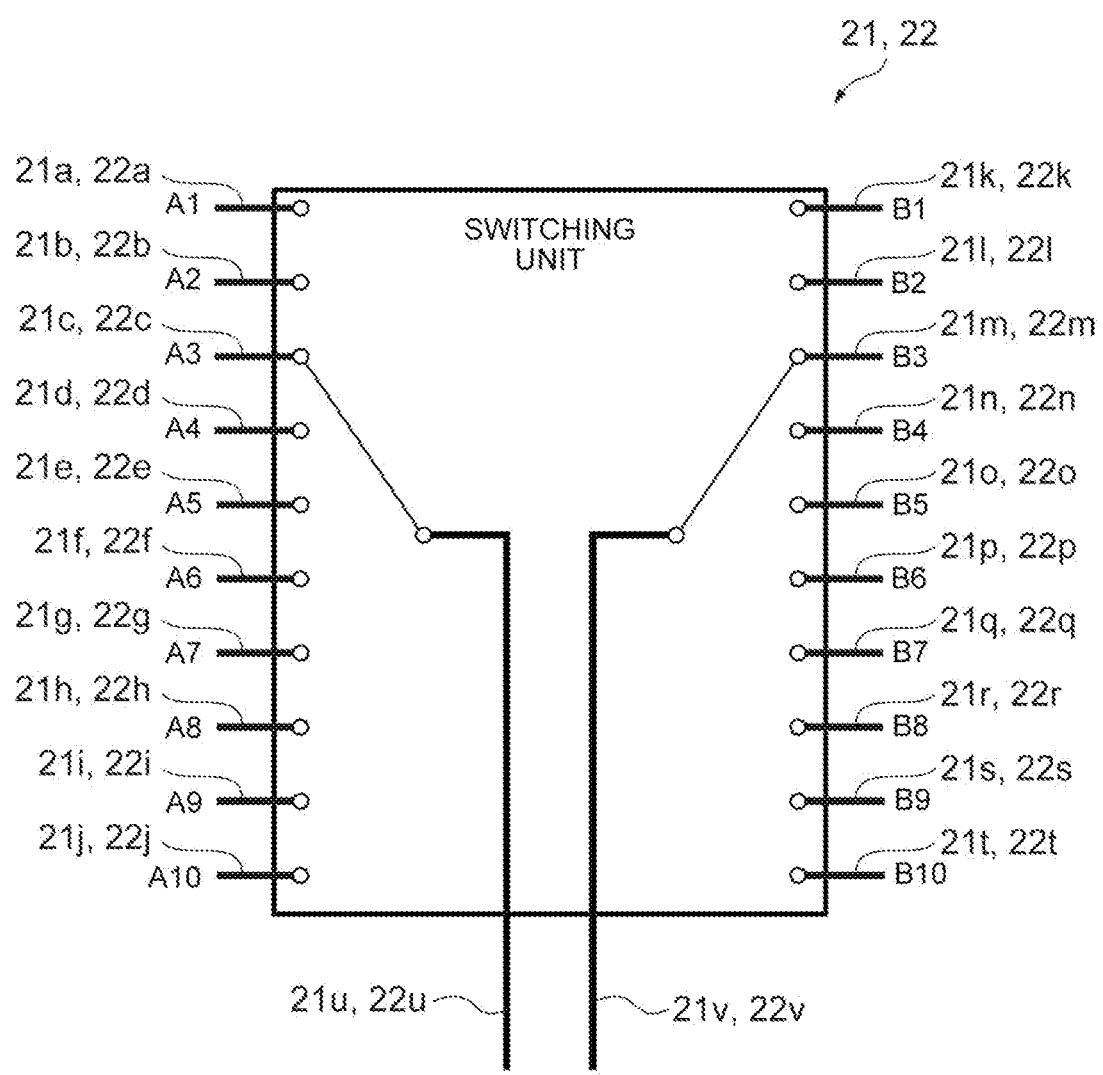
FIG. 7 is a diagram schematically illustrating a configuration of a switching unit of FIG. 2.
Figure 8A:
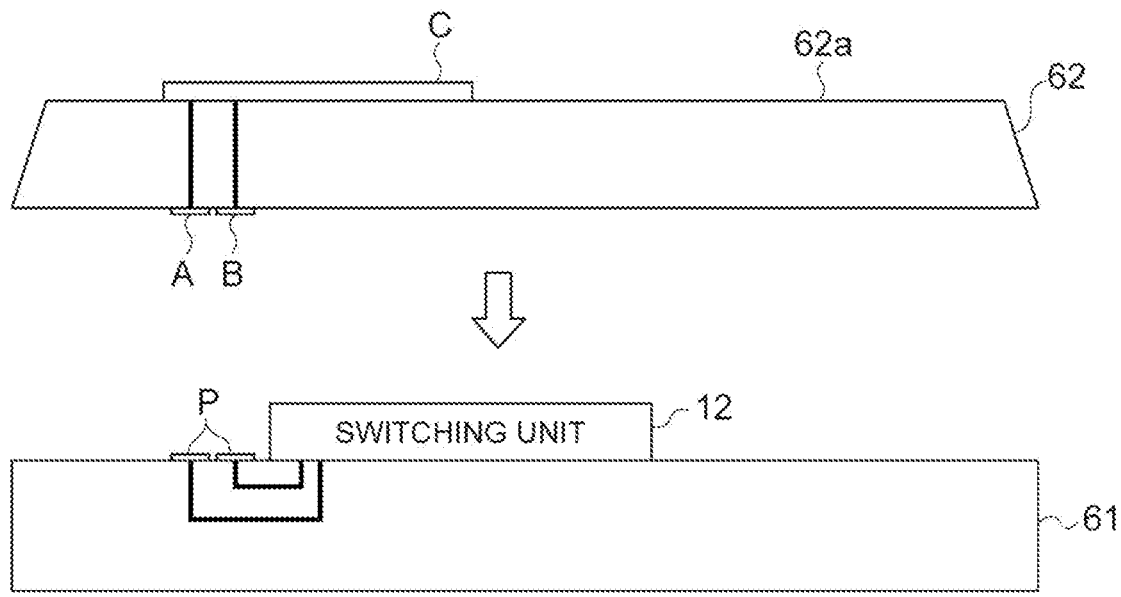
FIG. 8A is a diagram illustrating a base and a protection cover of a housing of a power transmission coil device of FIG. 1.
Figure 8B:
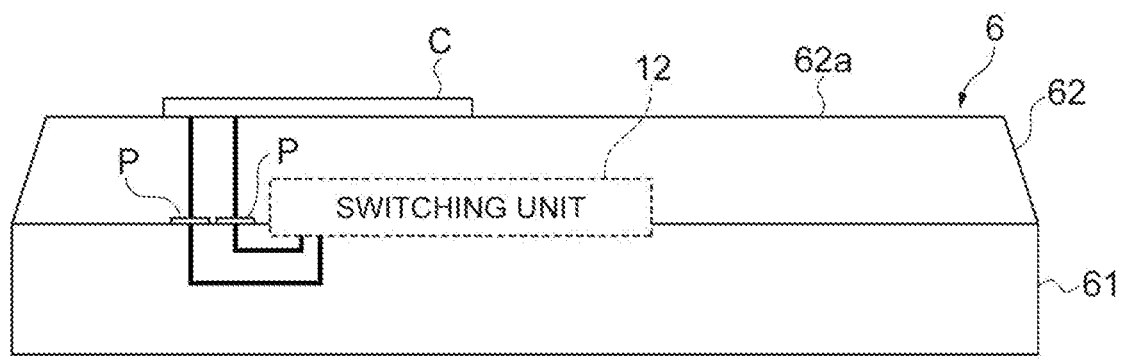
FIG. 8B is a diagram illustrating a state in which the protection cover is correctly attached to the base.
Figure 9A:
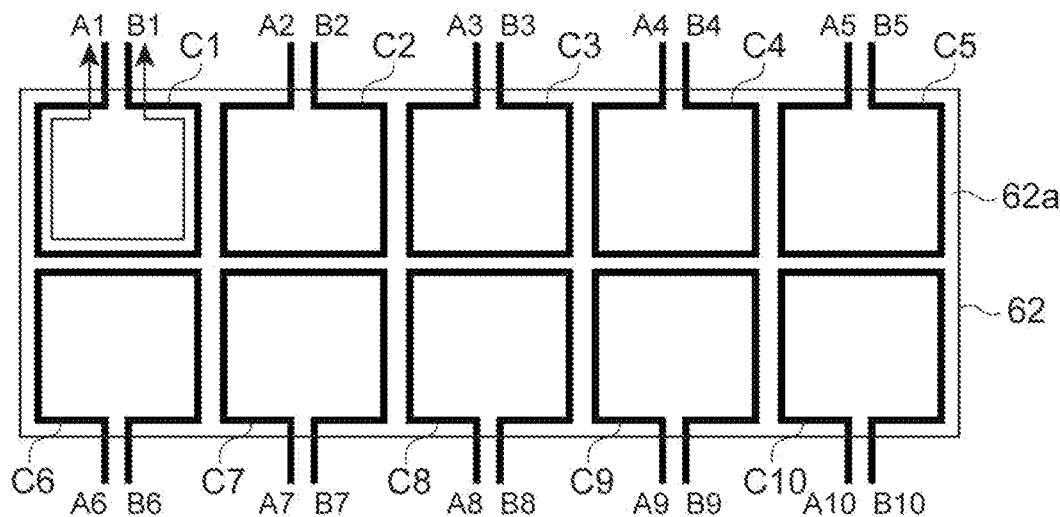
FIG. 9A is a diagram illustrating detection coils of a normal state.
Figure 9B:
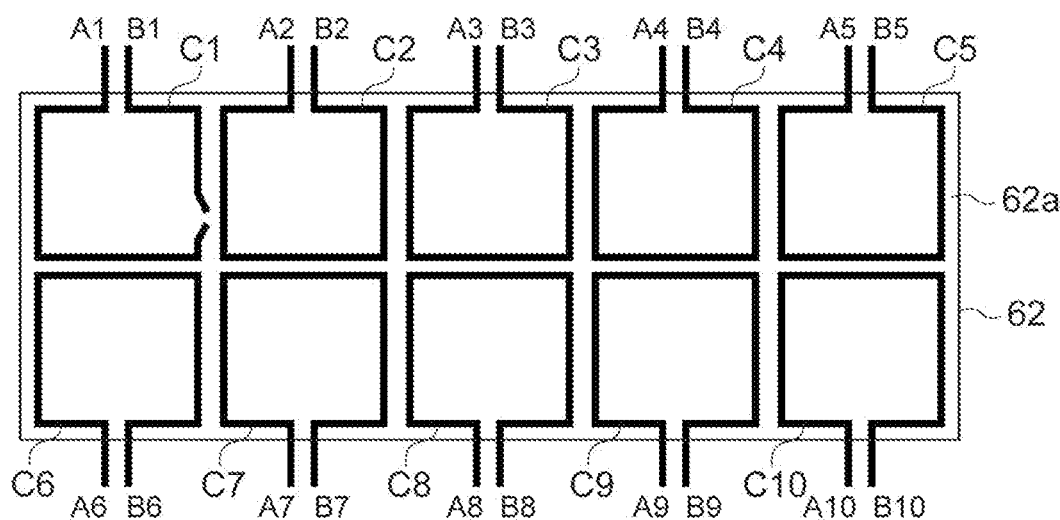
FIG. 9B is a diagram illustrating detection coils of a disconnected state.
Figure 10A:
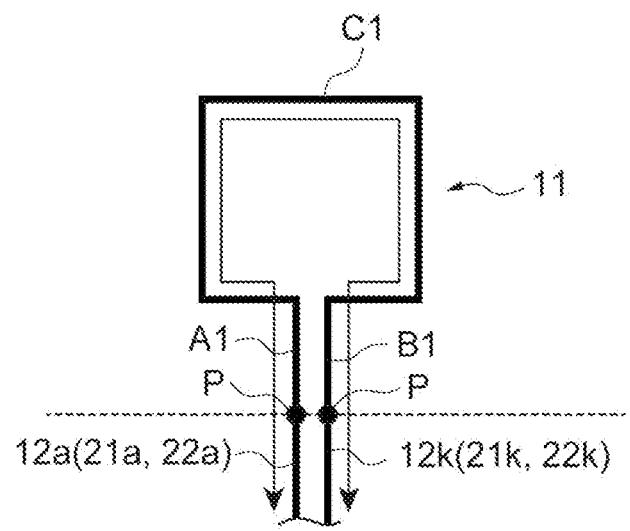
FIG. 10A is a diagram illustrating a state in which a protection cover is normally closed.
Figure 10B:
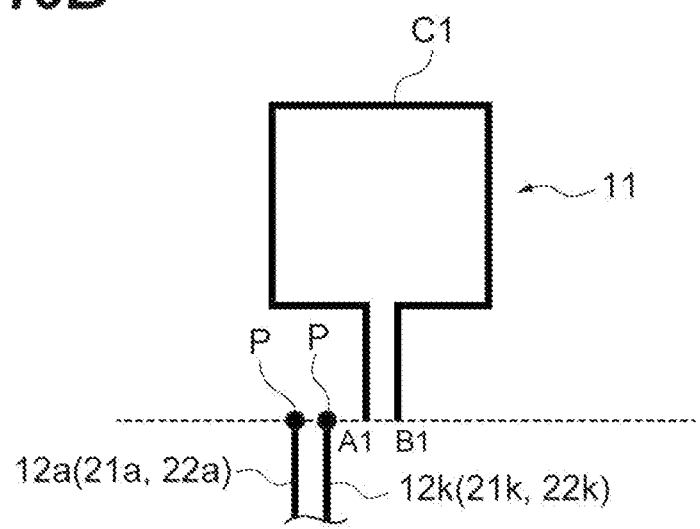
FIG. 10B is a diagram illustrating a state in which the protection cover is not normally closed.
Figure 11A:
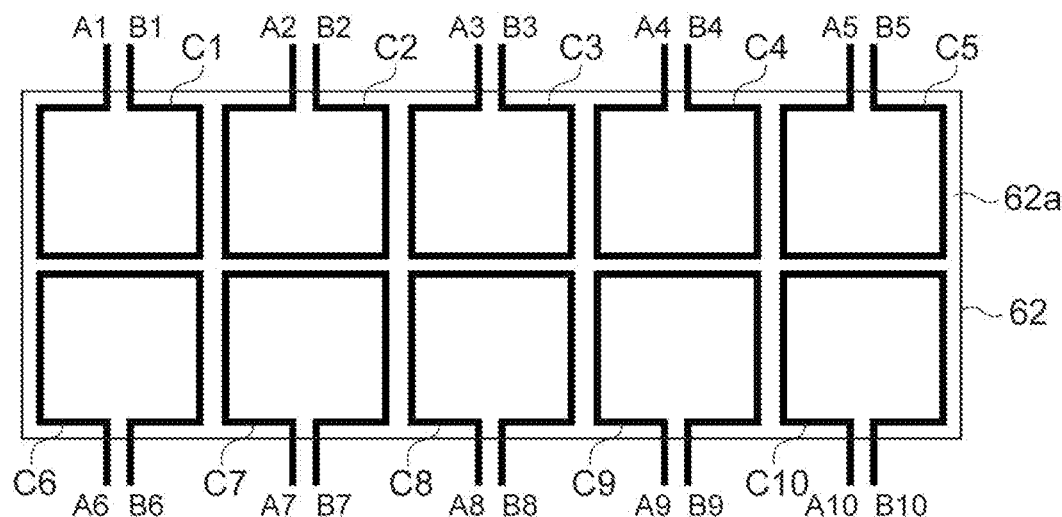
FIG. 11A is a diagram illustrating a first foreign object detection process when there is not a foreign object.
Figure 11B:
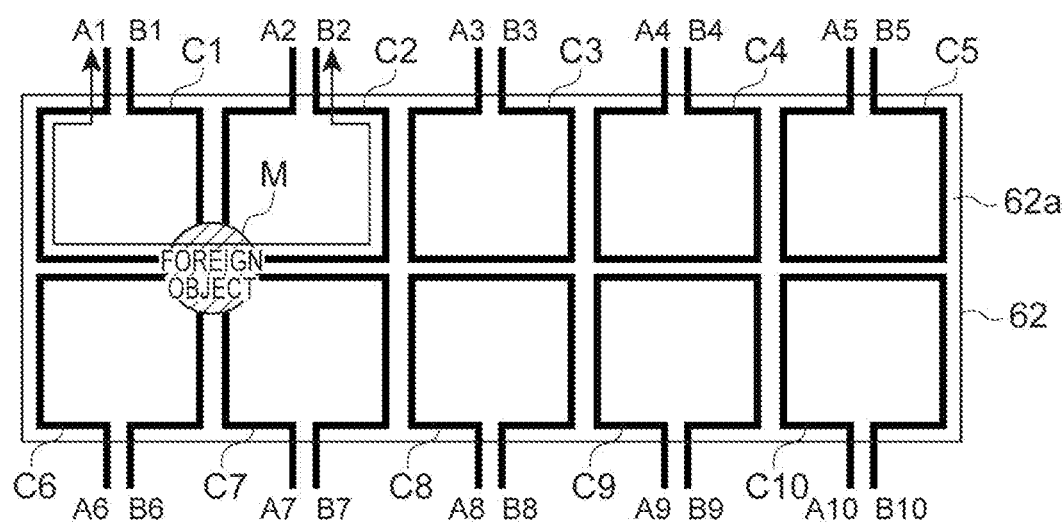
FIG. 11B is a diagram illustrating a first foreign object detection process when there is a foreign object.
Figure 12A:
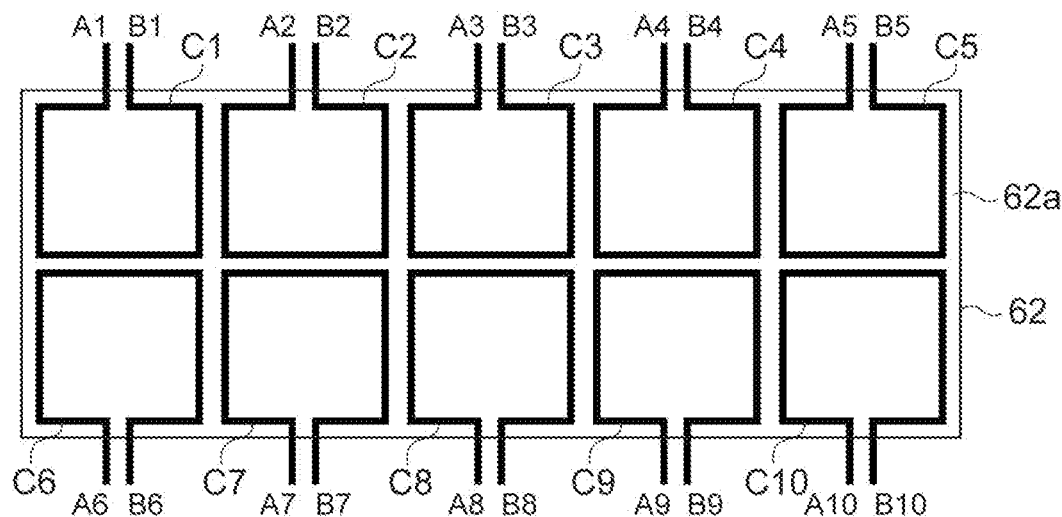
FIG. 12A is a diagram illustrating a second foreign object detection process when there is not a foreign object.
Figure 12B:
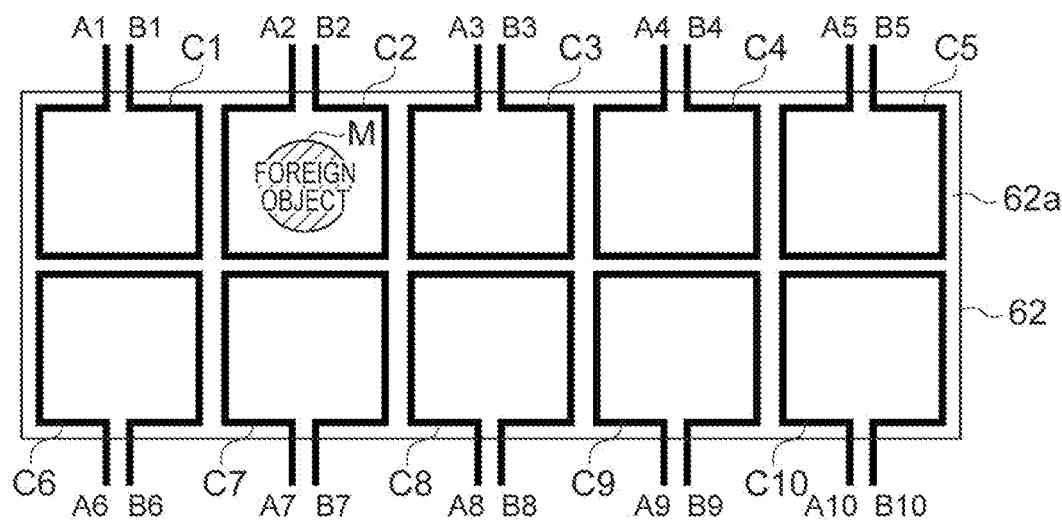
FIG. 12B is a diagram illustrating a second foreign object detection process when there is a foreign object.

A power transmission system 7 and a foreign object detection device 10 according to a first embodiment will be described in detail with reference to FIGS. 2 to 12B. FIG. 2 is a diagram illustrating a functional configuration of the power transmission system 7 according to the first embodiment. FIG. 3 is a diagram illustrating an arrangement example of components of the foreign object detection device 10 according to the first embodiment. FIG. 4 is a diagram illustrating an arrangement example of detection coils. FIG. 5A is a diagram illustrating a wiring example of detection coils. FIG. 5B is a diagram illustrating another wiring example of detection coils. FIG. 6 is a diagram illustrating an arrangement example of a switching unit. FIG. 7 is a diagram schematically illustrating a configuration of a switching unit. FIG. 8A is a diagram illustrating a base and a protection cover of a housing of a power transmission coil device of FIG. 1 and FIG. 8B is a diagram illustrating a state in which the protection cover is correctly attached to the base. FIG. 9A is a diagram illustrating detection coils of a normal state and FIG. 9B is a diagram illustrating detection coils of a disconnected state. FIG. 10A is a diagram illustrating a state in which a protection cover is normally closed and FIG. 10B is a diagram illustrating a state in which the protection cover is not normally closed. FIG. 11A is a diagram illustrating a first foreign object detection process when there is not a foreign object and FIG. 11B is a diagram illustrating the first foreign object detection process when there is a foreign object. FIG. 12A is a diagram illustrating a second foreign object detection process when there is not a foreign object and FIG. 12B is a diagram illustrating the second foreign object detection process when there is a foreign object. In FIGS. 3, 8A and 8B, only one detection coil 11 is illustrated for the convenience of description.

As illustrated in FIGS. 2 and 3, the foreign object detection device 10 includes a plurality of detection coils 11, a switching unit 12, a measurement unit 13, a control unit 14, and a storage unit 15.

The plurality of detection coils 11 are coils to detect the foreign object and include at least two detection coils (a first detection coil and a second detection coil). The detection coils 11 are disposed on a housing 6. The detection coil 11 is formed of one conductive wire configured using an electrically conductive material and a coil portion C is provided between a terminal A and a terminal B of the conductive wire. The coil portion C may have a shape in which a change of the magnetic flux interlinking with the coil portion C can be detected and is a coil of a rectangular shape of one turn or a coil of a shape of 8, for example. The coil portion C is disposed in a state in which the coil portion C is exposed to a surface 62a of a protection cover 62. The detection coil 11 is disposed not to physically contact other detection coil 11.

As illustrated in FIG. 4, each of the coil portions C of the plurality of detection coils 11 is disposed on the surface 62a, such that a region surrounded by the coil portion C does not overlap a region surrounded by the coil portion C of other detection coil 11. Each of the coil portions C of the plurality of detection coils 11 is separated from the coil portions C of the adjacent detection coils 11. An area of the region surrounded by the coil portion C is determined according to a size of a foreign object of a detection target. A distance between the coil portions C adjacent to each other is determined according to the size of the foreign object of the detection target.

In an example illustrated in FIG. 4, 10 coil portions C1 to C10 are disposed on the surface 62a. A terminal A and a terminal B of the detection coil 11 are electrically connected to a first switching unit 21 and a second switching unit 22. As illustrated in FIG. 5A, a leader portion D from the coil portion C of the detection coil 11 to the terminal A and a leader portion E from the coil portion C to the terminal B are arranged along a lateral surface 62c of the protection cover 62. In addition, as illustrated in FIG. 5B, the leader portions D and E of the detection coil 11 may penetrate the protection cover 62 from the surface 62a to a back surface 62b of the protection cover 62. In this case, a through-hole 62p is provided in the protection cover 62 and electrically conductive plating is performed on the through-hole 62p.

The switching unit 12 is a selector, for example. As illustrated in FIG. 6, the switching unit 12 is provided on a surface 61a of a base 61. That is, the switching unit 12 is accommodated in an accommodation space V of the housing 6. Conductive wires 12a to 12t extend from the switching unit 12 to a peripheral edge portion of the surface 61a and an electrically conductive pad P is provided in a leading edge of each of the conductive wires 12a to 12t. The electrically conductive pad P is made of an electrically conductive metal and has a rectangular shape, for example. The switching unit 12 includes a first switching unit 21 and a second switching unit 22.

As illustrated in FIG. 7, the first switching unit 21 includes a plurality of input terminals 21a to 21j, a plurality of input terminals 21k to 21t, an output terminal 21u, and an output terminal 21v. The input terminals 21a to 21t are connected to the conductive wires 12a to 12t, respectively. That is, the input terminals 21a to 21j correspond to terminals A1 to A10 of the plurality of detection coils 11 and the terminals A1 to A10 are connected to the input terminals 21a to 21j, respectively. The input terminals 21k to 21t correspond to terminals B1 to B10 of the plurality of detection coils 11 and the terminals B1 to B10 are connected to the input terminals 21k to 21t, respectively. An arrangement of the input terminals 21a to 21t of FIG. 7 does not show a physical arrangement and is changed from an arrangement of the conductive wires 12a to 12t of FIG. 6, for the convenience of description of a function of the first switching unit 21.

The first switching unit 21 selects any one of the input terminals 21a to 21j and electrically connects the selected input terminal to the output terminal 21u and selects any one of the input terminals 21k to 21t and electrically connects the selected input terminal to the output terminal 21v, according to a first switching instruction from the control unit 14. In other words, the first switching unit 21 selects any one of the terminals A1 to A10 of the plurality of detection coils 11 as a first terminal and electrically connects the first terminal to the output terminal 21u and selects any one of the terminals B1 to B10 of the plurality of detection coils 11 as a second terminal and electrically connects the second terminal to the output terminal 21v. In addition, the input terminals not selected in the first switching unit 21 are in an open state.

The second switching unit 22 includes a plurality of input terminals 22a to 22j, a plurality of input terminals 22k to 22t, an output terminal 22u, and an output terminal 22v. The input terminals 22a to 22t are connected to the conductive wires 12a to 12t, respectively. That is, the input terminals 22a to 22j correspond to the terminals A1 to A10 of the plurality of detection coils 11 and the terminals A1 to A10 are connected to the input terminals 22a to 22j, respectively. The input terminals 22k to 22t correspond to the terminals B1 to B10 of the plurality of detection coils 11 and the terminals B1 to B10 are connected to the input terminals 22k to 22t, respectively. An arrangement of the input terminals 22a to 22t of FIG. 7 does not show a physical arrangement and is changed from an arrangement of the conductive wires 12a to 12t of FIG. 6, for the convenience of description of a function of the second switching unit 22.

The second switching unit 22 selects any one of the input terminals 22a to 22j and electrically connects the selected input terminal to the output terminal 22u and selects any one of the input terminals 22k to 22t and electrically connects the selected input terminal to the output terminal 22v, according to a second switching instruction from the control unit 14. In other words, the second switching unit 22 selects any one of the terminals A1 to A10 of the plurality of detection coils 11 as a first terminal and electrically connects the first terminal to the output terminal 22u and selects any one of the terminals B1 to B10 of the plurality of detection coils 11 as a second terminal and electrically connects the second terminal to the output terminal 22v. In addition, the input terminals not selected in the second switching unit 22 are in an open state.

A set of input terminals connected to the same terminal of the same detection coil 11 in the input terminals 21a to 21t of the first switching unit 21 and the input terminals 22a to 22t of the second switching unit 22 is connected to the same conductive wire among the conductive wires 12a to 12t. For example, the input terminal 21a and the input terminal 22a are connected to the terminal A1 of the first detection coil 11 via the conductive wire 12a. As illustrated in FIG. 8B, the terminal A and the terminal B of each detection coil 11 and the corresponding conductive wires 12a to 12t are connected by the electrically conductive pads P. That is, the protection cover 62 is attached to the base 61 at a correct position, so that the terminal A and the terminal B contact the electrically conductive pads P provided in leading edges of the corresponding conductive wires and are electrically connected to the corresponding input terminals 21a to 21t and the corresponding input terminals 22a to 22t.

The measurement unit 13 is a measurement equipment such as an ohmmeter, an ammeter, and a voltmeter, for example. The measurement unit 13 is provided below the road surface R, for example. The measurement unit 13 includes a first measurement unit 31 and a second measurement unit 32.

The first measurement unit 31 measures a resistance value between the output terminal 21u and the output terminal 21v of the first switching unit 21, a value of a current flowing between the output terminal 21u and the output terminal 21v, or a voltage value between the output terminal 21u and the output terminal 21v. The first measurement unit 31 supplies a current between the output terminal 21u and the output terminal 21v and performs measurement, according to a first measurement instruction from the control unit 14. The first measurement unit 31 outputs a first measurement value to the control unit 14.

The second measurement unit 32 measures a resistance value between the output terminal 22u and the output terminal 22v of the second switching unit 22, a value of a current flowing between the output terminal 22u and the output terminal 22v, or a voltage value (potential difference between terminals) between the output terminal 22u and the output terminal 22v. The second measurement unit 32 performs measurement according to a second measurement instruction from the control unit 14. The second measurement unit 32 outputs a second measurement value to the control unit 14.

The control unit 14 executes a failure diagnosis process, a first foreign object detection process, and a second foreign object detection process. The control unit 14 is a computer (controller) including a processor and a memory, for example. The control unit 14 is provided below the road surface R, for example. The control unit 14 includes a switching control unit 41, a failure determination unit 42, and a foreign object detection unit 43.

The switching control unit 41 controls switching of the input terminal of the switching unit 12 connected to the output terminal of the switching unit 12. The switching control unit 41 outputs the first switching instruction to the first switching unit 21 and outputs the second switching instruction to the second switching unit 22. After outputting the first switching instruction, the switching control unit 41 outputs the first measurement instruction to the first measurement unit 31. After outputting the second switching instruction, the switching control unit 41 outputs the second measurement instruction to the second measurement unit 32.

The failure determination unit 42 functions as a failure determination mechanism for causing the first switching unit 21 to select the two terminals A and B of the same detection coil 11 as the first terminal and the second terminal and determining whether there is a failure, according to whether connection between the first terminal and the second terminal is in a short circuit state or an open state. Specifically, the failure determination unit 42 executes the failure diagnosis process. The failure diagnosis process is a process for determining whether the foreign object detection device 10 fails. The failure determination unit 42 causes the switching control unit 41 to output the first switching instruction, such that the terminal A and the terminal B of the same detection coil 11 are connected to the output terminal 21u and the output terminal 21v of the first switching unit 21, respectively. The failure determination unit 42 performs opening/short circuit determination on whether the terminal A and the terminal B of the detection coil 11 are in the open state (disconnected state) to be an electrically disconnected state or the short circuit state (conductive state) to be an electrically connected state, on the basis of the first measurement value received from the first measurement unit 31. The failure determination unit 42 performs the opening/short circuit determination on all the detection coils 11. Order of the detection coils 11 on which the opening/short circuit determination is performed is arbitrary.

The opening/short circuit determination is performed by comparing the first measurement value and a first threshold value stored in the storage unit 15. The first threshold value is a current value, a voltage value, and a resistance value that become determination standards on whether the terminal A and the terminal B of the detection coil 11 are in the short circuit state or the open state. In the case in which the first measurement value is the resistance value, if the first measurement value is equal to or larger than a first resistance threshold value, a state is determined as the open state and if the first measurement value is smaller than the first resistance threshold value, the state is determined as the short circuit state. If the terminals are in the open state, an extremely high resistance value is measured because a current does not flow. If the terminals are in the short circuit state, a resistance value of the conductive wires configuring the coils is measured and the value is generally small. In the case in which the first measurement value is the current value, if the first measurement value is equal to or larger than a first current threshold value, the state is determined as the short circuit state and if the first measurement value is smaller than the first current threshold value, the state is determined as the open state. If the terminals are in the open state, a current value close to 0 is measured because a current does not flow. If the terminals are in the short circuit state, a current value according to an amount of current flown is measured because the current flows. In the case in which the first measurement value is the voltage value, if the first measurement value is equal to or larger than a first voltage threshold value, the state is determined as the open state and if the first measurement value is smaller than the first voltage threshold value, the state is determined as the short circuit state. If the terminals are in the open state, a voltage value according to the voltage applied to the terminals is measured and if the terminals are in the short circuit state, a voltage value close to 0 is measured because a resistance value of the coil conductive wires is small.

As illustrated in FIG. 9A, when there is not disconnection in the conductive wire of the detection coil 11, for example, a current supplied to the terminal A1 of the first detection coil 11 is output from the terminal B1. At this time, the current value measured by the first measurement unit 31 becomes equal to or larger than the first current threshold value and the voltage value and the resistance value between the terminal A1 and the terminal B1 become smaller than the first voltage threshold value and the first resistance threshold value, respectively. For this reason, the failure determination unit 42 determines that the terminal A1 and the terminal B1 of the detection coil 11 enter the short circuit state. Similar to the above, the failure determination unit 42 determines that the terminal A and the terminal B enter the short circuit state, for the other detection coils 11.

As illustrated in FIG. 9B, when there is the disconnection in the conductive wire of the first detection coil 11, for example, the current supplied to the terminal A1 of the first detection coil 11 is not output from the terminal B1 or a current of a small current value is output. At this time, the current value measured by the first measurement unit 31 becomes smaller than the first current threshold value and the voltage value and the resistance value between the terminal A1 and the terminal B1 become equal to or larger than the first voltage threshold value and the first resistance threshold value, respectively. For this reason, the failure determination unit 42 determines that the terminal A1 and the terminal B1 of the first detection coil 11 enter the open state.

As illustrated in FIG. 10A, when the protection cover 62 is attached to a correct position of the base 61 (when the protection cover 62 is correctly closed), the terminal A and the terminal B of the detection coil 11 contact the corresponding electrically conductive pads P. In this state, a current supplied to the input terminal of the first switching unit 21 to which the terminal A1 of the first detection coil 11 is connected is input to the input terminal of the first switching unit 21 to which the terminal B1 of the first detection coil 11 is connected, via the detection coil 11. At this time, similar to FIG. 9A, the current value measured by the first measurement unit 31 becomes equal to or larger than the first current threshold value and the voltage value and the resistance value between the terminal A1 and the terminal B1 become smaller than the first voltage threshold value and the first resistance threshold value, respectively. For this reason, the failure determination unit 42 determines that the terminal A1 and the terminal B1 of the detection coil 11 enter the short circuit state. Similar to the above, the failure determination unit 42 determines that the terminal A and the terminal B enter the short circuit state, for the other detection coils 11.

As illustrated in FIG. 10B, when the protection cover 62 is deviated from the correct position of the base 61 and is attached (when the protection cover 62 is not correctly closed), the terminal A and the terminal B of the detection coil 11 do not contact the corresponding electrically conductive pads P. In this state, a current supplied to the input terminal of the first switching unit 21 to which the terminal A1 of the first detection coil 11 is connected is not input to the input terminal of the first switching unit 21 to which the terminal B1 of the first detection coil 11 is connected or a current of a small current value is input. At this time, similar to FIG. 9B, the current value measured by the first measurement unit 31 becomes smaller than the first current threshold value and the voltage value and the resistance value between the terminal A1 and the terminal B1 become equal to or larger than the first voltage threshold value and the first resistance threshold value, respectively. For this reason, the failure determination unit 42 determines that the terminal A1 and the terminal B1 of the detection coil 11 enter the open state. Similar to the above, the failure determination unit 42 determines that the terminal A and the terminal B enter the open state, for the other detection coils 11.

That is, when the protection cover 62 is attached to the correct position of the base 61 and there is not the disconnection in the conductive wire of the detection coil 11, the failure determination unit 42 determines that the terminal A and the terminal B of the detection coil 11 enter the short circuit state. When the protection cover 62 is deviated from the correct position of the base 61 and is attached or there is the disconnection in the conductive wire of the detection coil 11, the failure determination unit 42 determines that the terminal A and the terminal B of the detection coil 11 enter the open state. When it is determined that the terminals A and the terminals B of all the detection coils 11 are in the short circuit state, the failure determination unit 42 determines that the foreign object detection device 10 does not fail. When it is determined that the terminal A and the terminal B of at least any detection coil 11 are in the open state, it is considered that the detection coil 11 is disconnected or the protection cover 62 is not attached to the correction position of the base 61. For this reason, the failure determination unit 42 determines that the foreign object detection device 10 fails. When it is determined that the foreign object detection device 10 fails, the failure determination unit 42 controls the power transmitter 2 such that power feeding is prohibited. The control of the power transmitter 2 is realized by outputting a power feeding prohibition instruction to the power transmitter 2 by the foreign object detection device 10.

The foreign object detection unit 43 executes a first foreign object detection process and a second foreign object detection process. The first foreign object detection process is a foreign object detection process using the opening/short circuit determination. The foreign object detection unit 43 causes the switching control unit 41 to output the first switching instruction, such that the terminal A of one detection coil 11 and the terminal B of the other detection coil 11 are connected to the output terminal 21$u$ and the output terminal 21$v$ of the first switching unit 21, respectively, for a combination of the two different detection coils 11. The foreign object detection unit 43 performs the opening/short circuit determination on whether the terminal A of one detection coil 11 and the terminal B of the other detection coil 11 are in the open state or the short circuit state, on the basis of the first measurement value received from the first measurement unit 31. The foreign object detection unit 43 performs the opening/short circuit determination on all combinations of the two different detection coils 11 among all the detection coils 11. Order of the combinations of the detection coils 11 on which the opening/short circuit determination is performed is arbitrary.

As illustrated in FIG. 11A, when there is not a foreign object M on the surface 62$a$ of the protection cover 62, for example, in a combination of the first detection coil 11 and the second detection coil 11, the current supplied to the terminal A1 of the first detection coil 11 is not output from the terminal B2 of the second detection coil 11. At this time, the current value measured by the first measurement unit 31 becomes smaller than the first current threshold value and the voltage value and the resistance value between the terminal A1 and the terminal B2 become equal to or larger than the first voltage threshold value and the first resistance threshold value, respectively. For this reason, the foreign object detection unit 43 determines that the terminal A1 of the first detection coil 11 and the terminal B2 of the second detection coil 11 enter the open state. Similar to the above, the failure determination unit 42 determines that the terminal A of one detection coil 11 and the terminal B of the other detection coil 11 enter the open state, for the other combinations of the two detection coils 11.

As illustrated in FIG. 11B, when there is the foreign object M contacting the coil portion C1 of the first detection coil 11, the coil portion C2 of the second detection coil 11, the coil portion C6 of the sixth detection coil 11, and the coil portion C7 of the seventh detection coil 11, for example, in the combination of the first detection coil 11 and the second detection coil 11, the current supplied to the terminal A1 of the first detection coil 11 flows through the coil portion C1, the foreign object M, and the coil portion C2 sequentially and is output from the terminal B2 of the second detection coil 11. At this time, the current value measured by the first measurement unit 31 becomes equal to or larger than the first current threshold value and the voltage value and the resistance value between the terminal A1 and the terminal B2 become smaller than the first voltage threshold value and the first resistance threshold value, respectively. Therefore, the foreign object detection unit 43 determines that the terminal A1 of the first detection coil 11 and the terminal B2 of the second detection coil 11 enter the short circuit state. The foreign object M becomes resistance when the current is flown. For this reason, in the short circuit state due to the presence of the foreign object M, an increase in the resistance value, a decrease in the current, and an increase in the voltage (potential difference) may be generated as compared with the short circuit state between the terminals of the same coil in which there is not the foreign object M. Therefore, the first current threshold value, the first voltage threshold value, and the first resistance threshold value are determined on the basis of the resistance value of the assumed foreign object M.

When it is determined that the terminal A and the terminal B are in the short circuit state in at least any combination, it is considered that the detection coils 11 of the combination enter the short circuit state due to the foreign object. For this reason, the foreign object detection unit 43 determines that there is the foreign object on the surface 62$a$ of the protection cover 62. For all combinations of the detection coils 11, when it is determined that the terminal A and the terminal B are in the open state, the foreign object detection unit 43 determines that there is not a foreign object, which can be detected by the first foreign object detection process, on the surface 62$a$ of the protection cover 62.

The second foreign object detection process is a foreign object detection process using a change in an amount of magnetic flux interlinking with the coil portion C of the detection coil 11. During feeding of power from the power transmission coil device 4 to the power reception coil device 5, the magnetic flux is generated from the power transmission coil device 4. A part of the magnetic flux interlinks with the coil portion C of the detection coil 11, so that an induced voltage (induced electromotive force) and an induced current are generated between the terminal A and the terminal B of the detection coil 11. The induced voltage and the induced current change according to an amount of magnetic flux interlinking with the coil portion C. When there is an electrically conductive foreign object in a region surrounded by the coil portion C, a change in an amount of magnetic flux between the power transmission coil device 4 and the power reception coil device 5 and a change of a magnetic flux path are caused by a material of the foreign object. For example, when the foreign object is a magnetic material (for example, iron), the magnetic flux is generated by spontaneous magnetization of the foreign object or the magnetic flux path is changed by concentration of the magnetic flux on the foreign object. As a result, an amount of magnetic flux interlinking with the coil portion C may increase/decrease. In addition, when the foreign object is a non-magnetic material (for example, aluminum or copper), the magnetic flux path changes to avoid the foreign object. For this reason, an amount of magnetic flux interlinking with the coil portion C may increase/decrease.

The foreign object detection unit 43 outputs a power feeding instruction to the power transmitter 2 to feed power to the power transmission coil device 4 for the second foreign object detection process. The power fed to the power transmission coil device 4 for the second foreign object detection process can be appropriately adjusted according to a size of the foreign object of the detection target. The power may be power (for example, about 3.3 kW) at the time of wireless power transfer (at the time of normal power feeding when there is not a foreign object) and may be power (for example, about 100 W) smaller than the power. The foreign object detection unit 43 causes the switching control unit 41 to output the second switching instruction, such that the terminal A and the terminal B of the same detection coil 11 are connected to the output terminal 22*u* and the output terminal 22*v* of the second switching unit 22, respectively. The foreign object detection unit 43 performs magnetic flux amount change determination on whether an amount of magnetic flux of the detection coil 11 changes, on the basis of the second measurement value received from the second measurement unit 32. The foreign object detection unit 43 performs the magnetic flux amount change determination on all the detection coils 11. Order of the detection coils 11 on which the magnetic flux amount change determination is performed is arbitrary.

The magnetic flux amount change determination is performed by comparing a difference (absolute value) between the second measurement value and a second measurement value (standard measurement value) when there is not a foreign object with a second threshold value stored in the storage unit 15. The second threshold value is a current value and a voltage value becoming determination standards on whether a state is a state in which there is the foreign object in the region surrounded by the coil portion C or a state in which there is not the foreign object in the region. In the case in which the second measurement value is the current value, if a difference of the second measurement value and the standard measurement value is equal to or larger than a second current threshold value, it is determined that an amount of magnetic flux changes and if the difference is smaller than the second current threshold value, it is determined that the amount of magnetic flux does not change. In the case in which the second measurement value is the voltage value, if the difference of the second measurement value and the standard measurement value is equal to or larger than a second voltage threshold value, it is determined that an amount of magnetic flux changes and if the second measurement value is smaller than the second voltage threshold value, it is determined that the amount of magnetic flux does not change.

As illustrated in FIG. 12A, when there is not the foreign object M on the surface 62*a* of the protection cover 62, an amount of magnetic flux according to power feeding from the power transmission coil device 4 interlinks with the coil portion C of the second detection coil 11. At this time, a difference of a current value of an induced current flowing to the terminal A2 and the terminal B2 of the second detection coil 11, that is, a current value measured by the second measurement unit 32 and the standard measurement value becomes smaller than the second current threshold value and a difference of a voltage value of an induced voltage generated in the terminal A2 and the terminal B2 of the second detection coil 11, that is, a voltage value measured by the second measurement unit 32 and the standard measurement value becomes smaller than the second voltage threshold value. For this reason, the foreign object detection unit 43 determines that there is not the foreign object M in the region surrounded by the coil portion C of the second detection coil 11. Similar to the above, the foreign object detection unit 43 determines that there is not the foreign object M in the region surrounded by the coil portion C of the detection coil 11, for the other detection coils 11.

As illustrated in FIG. 12B, when there is the foreign object M in the region surrounded by the coil portion C2 of the second detection coil 11, an amount of magnetic flux different from the amount of magnetic flux according to the power feeding from the power transmission coil device 4 interlinks with the coil portion C of the second detection coil 11. At this time, the difference of the current value of the induced current flowing to the terminal A2 and the terminal B2 of the second detection coil 11, that is, the current value measured by the second measurement unit 32 and the standard measurement value becomes equal to or larger than the second current threshold value and the difference of the voltage value of the induced voltage generated in the terminal A2 and the terminal B2 of the second detection coil 11, that is, the voltage value measured by the second measurement unit 32 and the standard measurement value becomes equal to or larger than the second voltage threshold value. For this reason, the foreign object detection unit 43 determines that there is the foreign object M in the region surrounded by the coil portion C of the second detection coil 11.

When it is determined that an amount of magnetic flux of at least any detection coil 11 changes, it is considered that there is the foreign object in the region surrounded by the coil portion C of the detection coil 11. For this reason, the foreign object detection unit 43 determines that there is the foreign object on the surface 62*a* of the protection cover 62. When it is determined that magnetic flux amounts of all the detection coils 11 do not change, the foreign object detection unit 43 determines that there is not a foreign object, which can be detected by the second foreign object detection process, on the surface 62*a* of the protection cover 62.

When it is determined by the first foreign object detection process or the second foreign object detection process that there is the foreign object on the surface 62*a* of the protection cover 62, the foreign object detection unit 43 controls the power transmitter 2 such that power feeding is adjusted. The control of the power transmitter 2 is realized by outputting a power feeding adjustment instruction to the power transmitter 2 by the foreign object detection unit 43. The power feeding adjustment instruction is an instruction to prohibit power feeding of wireless power transfer or an instruction to feed power lower than power at the time of normal wireless power transfer, for example. In both the first foreign object detection process and the second foreign object detection process, when it is determined that there is not a foreign object on the surface 62*a* of the protection cover 62, the foreign object detection unit 43 outputs a power feeding instruction to the power transmitter 2, such that power is fed to the power transmission coil device 4 for wireless power transfer.

The control unit 16 of the power transmitter 2 performs power feeding to the power receiver 3 by the power transmission coil device 4, according to the power feeding instruction from the foreign object detection unit 43. The control unit 16 prohibits power feeding to the power receiver 3 or feeds low power to the power receiver 3, according to the power feeding prohibition instruction or the power feeding adjustment instruction from the failure determination unit 42 and the foreign object detection unit 43.

Figure 13:
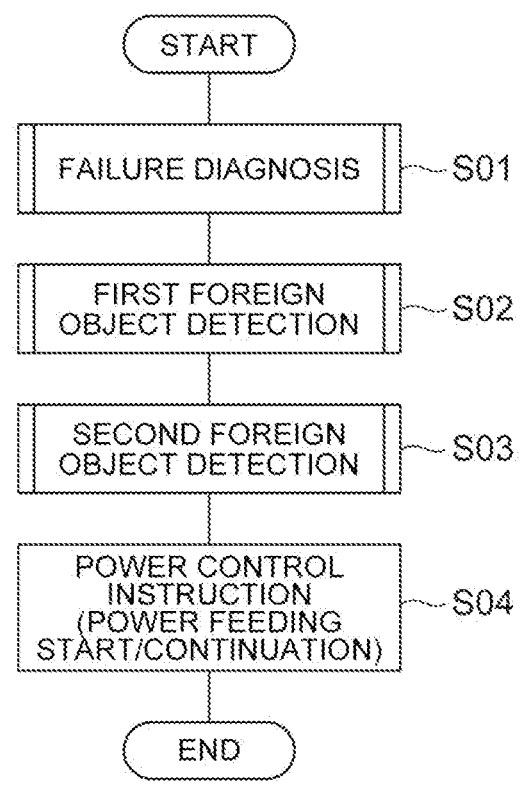
FIG. 13 is a flowchart illustrating a series of processes executed by a foreign object detection device of FIG. 2.
Figure 14:
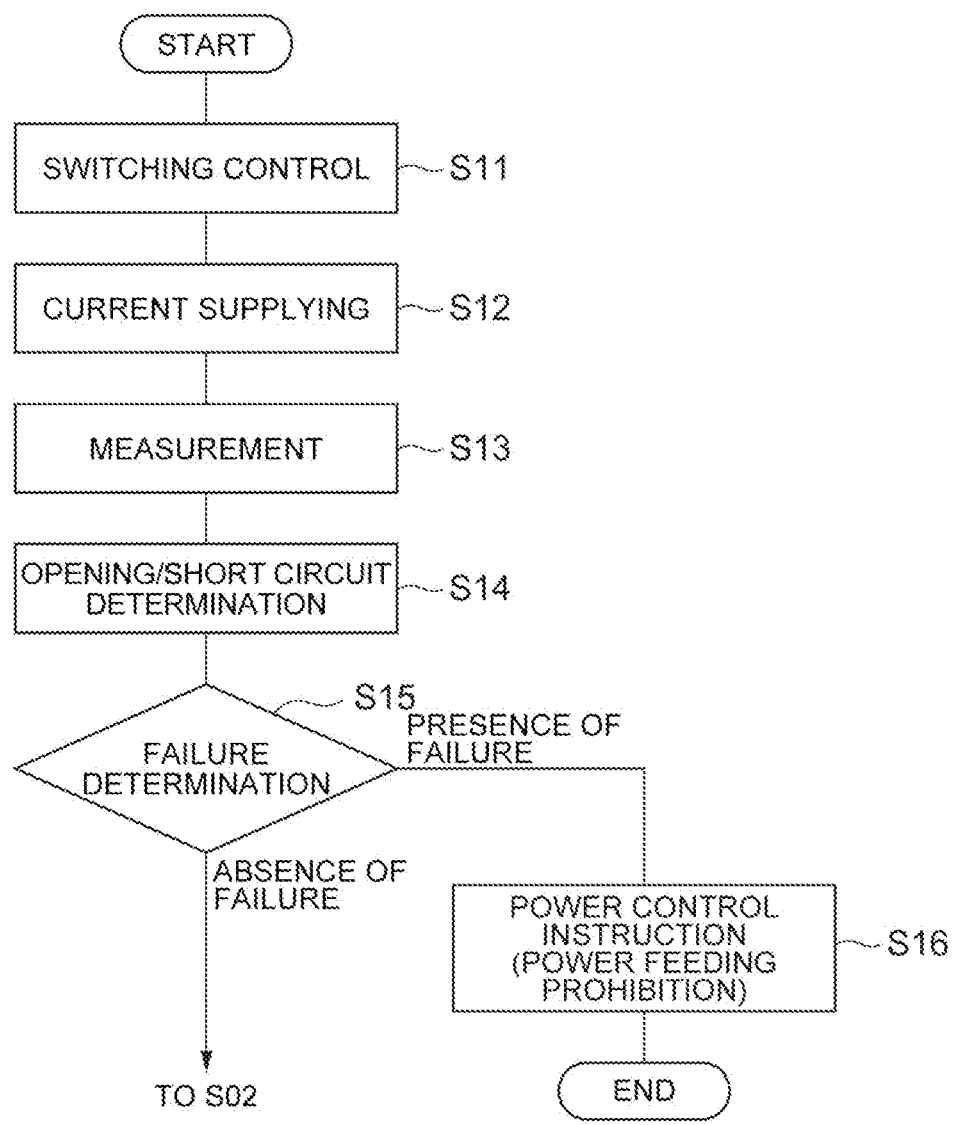
FIG. 14 is a flowchart illustrating a failure diagnosis process of FIG. 13 in detail.
Figure 15:
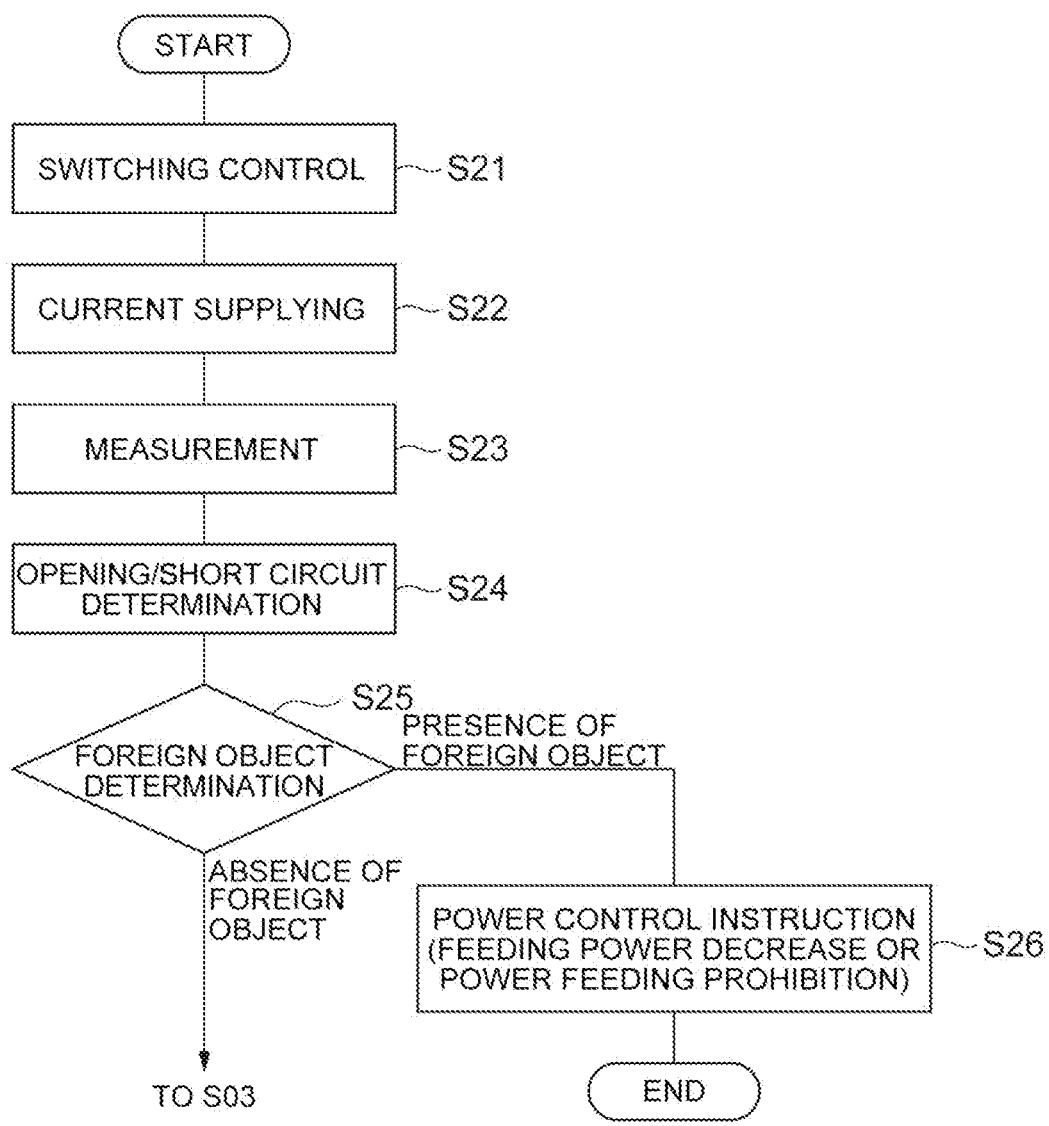
FIG. 15 is a flowchart illustrating a first foreign object detection process of FIG. 13 in detail.
Figure 16:
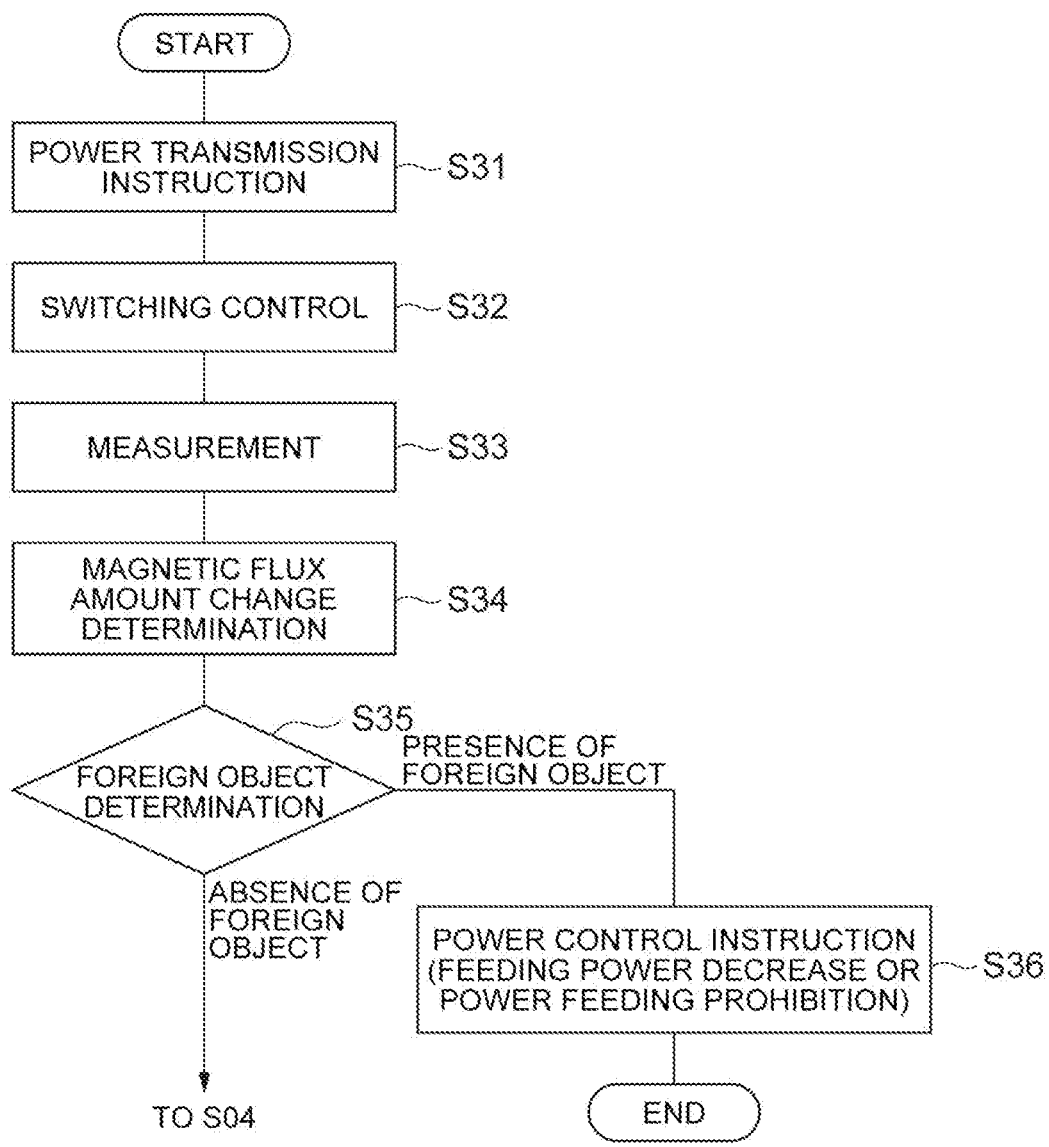
FIG. 16 is a flowchart illustrating a second foreign object detection process of FIG. 13 in detail.

Next, a series of processes executed by the foreign object detection device 10 will be described with reference to FIGS. 13 to 16. FIG. 13 is a flowchart illustrating the series of processes executed by the foreign object detection device 10. FIG. 14 is a flowchart illustrating a failure diagnosis process of FIG. 13 in detail. FIG. 15 is a flowchart illustrating the first foreign object detection process of FIG. 13 in detail. FIG. 16 is a flowchart illustrating the second foreign object detection process of FIG. 13 in detail. The process illustrated in FIG. 13 starts according to a power feeding start instruction for the power transmission coil device 4, for example.

First, the foreign object detection device 10 executes the failure diagnosis process (step S01). In the failure diagnosis process of step S01, as illustrated in FIG. 14, first, the failure determination unit 42 causes the switching control unit 41 to output the first switching instruction, such that the input terminal connected to the terminal A of the same detection coil 11 and the input terminal connected to the terminal B are connected to the output terminal 21*u* and the output terminal 21*v*, respectively, in the first switching unit 21. In addition, the first switching unit 21 selects any one of the input terminals 21*a* to 21*j* and electrically connects the selected input terminal to the output terminal 21*u* and selects any one of the input terminals 21*k* to 21*t* and electrically connects the selected input terminal to the output terminal 21*v*, according to the first switching instruction from the switching control unit 41 (step S11).

After outputting the first switching instruction, the switching control unit 41 outputs the first measurement instruction to the first measurement unit 31. According to the first measurement instruction from the switching control unit 41, the first measurement unit 31 supplies a current between the output terminal 21*u* and the output terminal 21*v* (step S12) and measures a value of the current flowing between the output terminal 21*u* and the output terminal 21*v*, a voltage value between the output terminal 21*u* and the output terminal 21*v*, or a resistance value between the output terminal 21*u* and the output terminal 21*v* (step S13). In addition, the first measurement unit 31 outputs a first measurement value to the control unit 14. In addition, the failure determination unit 42 performs the opening/short circuit determination on whether the terminal A and the terminal B of the detection coil 11 are in the open state or the short circuit state, on the basis of the first measurement value received from the first measurement unit 31 (step S14). The processes of steps S11 to S14 are repeated sequentially for all the detection coils 11.

In addition, the failure determination unit 42 determines whether the foreign object detection device 10 fails or not, on the basis of a determination result of the opening/short circuit determination in step S14 (step S15). In step S15, when it is determined that the terminal A and the terminal B of at least any detection coil 11 are in the open state, it is considered that the detection coil 11 is disconnected or the protection cover 62 is not attached to a correct position of the base 61. For this reason, the failure determination unit 42 determines that the foreign object detection device 10 fails (step S15; presence of failure).

In addition, the failure determination unit 42 outputs the power feeding prohibition instruction to the power transmitter 2 (control unit 16) (step S16). In addition, the power transmitter 2 prohibits power feeding to the power receiver 3 according to the power feeding prohibition instruction from the failure determination unit 42 and the series of processes executed by the foreign object detection device 10 ends. Meanwhile, in step S15, when it is determined that the terminals A and the terminals B of all the detection coils 11 are in the short circuit state, the failure determination unit 42 determines that the foreign object detection device 10 does not fail (step S15; absence of failure) and proceeds to step S02.

Next, the foreign object detection device 10 executes the first foreign object detection process (step S02). In the first foreign object detection process of step S02, as illustrated in FIG. 15, first, the foreign object detection unit 43 causes the switching control unit 41 to output the first switching instruction, such that the input terminal connected to the terminal A of one detection coil 11 and the input terminal connected to the terminal B of the other detection coil 11 are connected to the output terminal 21*u* and the output terminal 21*v*, respectively, for a combination of the two different detection coils 11, in the first switching unit 21. In addition, the first switching unit 21 selects any one of the input terminals 21*a* to 21*j* and electrically connects the selected input terminal to the output terminal 21*u* and selects any one of the input terminals 21*k* to 21*t* and electrically connects the selected input terminal to the output terminal 21*v*, according to the first switching instruction from the switching control unit 41 (step S21).

After outputting the first switching instruction, the switching control unit 41 outputs the first measurement instruction to the first measurement unit 31. According to the first measurement instruction from the switching control unit 41, the first measurement unit 31 supplies a current between the output terminal 21*u* and the output terminal 21*v* (step S22) and measures a value of the current flowing between the output terminal 21*u* and the output terminal 21*v*, a voltage value between the output terminal 21*u* and the output terminal 21*v*, or a resistance value between the output terminal 21*u* and the output terminal 21*v* (step S23). In addition, the first measurement unit 31 outputs a first measurement value to the control unit 14. In addition, the foreign object detection unit 43 performs the opening/short circuit determination on whether the terminal A of one detection coil 11 and the terminal B of the other detection coil 11 are in the open state or the short circuit state, on the basis of the first measurement value received from the first measurement unit 31 (step S24). The processes of steps S21 to S24 are repeated sequentially for all combinations of the two different detection coils 11 among all the detection coils 11.

In addition, the foreign object detection unit 43 determines whether there is the foreign object or not on the surface 62*a* of the protection cover 62, on the basis of a determination result of the opening/short circuit determination in step S24 (step S25). In step S25, when it is determined that when the terminal A and the terminal B are in the short circuit state in at least any combination, it is considered that the detection coils 11 of the combination are in the short circuit state due to the foreign object. For this reason, the foreign object detection unit 43 determines that there is the foreign object on the surface 62*a* of the protection cover 62 (step S25; presence of foreign object).

In addition, the foreign object detection unit 43 outputs the power feeding adjustment instruction to the power transmitter 2 (control unit 16) (step S26). In addition, the power transmitter 2 prohibits power feeding to the power receiver 3 or causes power fed to the power receiver 3 to be lower than power at the time of wireless power transfer, according to the power feeding adjustment instruction from the foreign object detection unit 43, and the series of processes executed by the foreign object detection device 10 ends. Meanwhile, in step S25, when it is determined that the terminal A and the terminal B are in the open state for all combinations of the detection coils 11, the foreign object detection unit 43 determines that there is not the foreign object, which can be detected by the first foreign object detection process, on the surface 62*a* of the protection cover 62 (step S25; absence of foreign object) and proceeds to step S03.

Next, the foreign object detection device 10 executes the second foreign object detection process (step S03). In the second foreign object detection process of step S03, as illustrated in FIG. 16, first, the foreign object detection unit 43 outputs the power feeding instruction to the power transmitter 2 (control unit 16), such that power is fed to the power transmission coil device 4 for the second foreign object detection process (step S31). In addition, the power transmitter 2 feeds power to the power receiver 3, according to the power feeding instruction from the foreign object detection unit 43. At this time, the power fed to the power transmission coil device 4 may be power at the time of wireless power transfer and may be power smaller than the power.

In addition, the foreign object detection unit 43 causes the switching control unit 41 to output the second switching instruction, such that the input terminal connected to the terminal A of the detection coil 11 and the input terminal connected to the terminal B of the same detection coil 11 are connected to the output terminal 22$u$ and the output terminal 22$v$, respectively, in the second switching unit 22. In addition, the second switching unit 22 selects any one of the input terminals 22$a$ to 22$j$ and electrically connects the selected input terminal to the output terminal 22$u$ and selects any one of the input terminals 22$k$ to 22$t$ and electrically connects the selected input terminal to the output terminal 22$v$, according to the second switching instruction from the foreign object detection unit 43 (step S32).

After outputting the second switching instruction, the switching control unit 41 outputs the second measurement instruction to the second measurement unit 32. According to the second measurement instruction from the switching control unit 41, the second measurement unit 32 measures a current value of a current flowing between the output terminal 22$u$ and the output terminal 22$v$ or a voltage value between the output terminal 22$u$ and the output terminal 22$v$ (step S33). In addition, the second measurement unit 32 outputs a second measurement value to the control unit 14. In addition, the foreign object detection unit 43 performs magnetic flux amount change determination on whether an amount of magnetic flux of the detection coil 11 changes as compared with an amount of magnetic flux when there is not the foreign object, on the basis of the second measurement value received from the second measurement unit 32 (step S34). The processes of steps S32 to S34 are repeated sequentially for all the detection coils 11.

In addition, the foreign object detection unit 43 determines whether there is the foreign object or not on the surface 62$a$ of the protection cover 62, on the basis of a determination result of the magnetic flux amount change determination in step S34 (step S35). In step S35, when it is determined that the magnetic flux amount of at least any detection coil 11 changes, it is considered that there is the foreign object in the region surrounded by the coil portion C of the detection coil 11. For this reason, the foreign object detection unit 43 determines that there is the foreign object on the surface 62$a$ of the protection cover 62 (step S35; presence of foreign object).

In addition, the foreign object detection unit 43 outputs the power feeding adjustment instruction to the power transmitter 2 (control unit 16) (step S36). In addition, the power transmitter 2 prohibits power feeding to the power receiver 3 or causes power fed to the power receiver 3 to be lower than power at the time of the wireless power transfer, according to the power feeding adjustment instruction from the foreign object detection unit 43, and the series of processes executed by the foreign object detection device 10 ends. Meanwhile, in step S35, when it is determined that magnetic flux amounts of all the detection coils 11 do not change, the foreign object detection unit 43 determines that there is not the foreign object, which can be detected by the second foreign object detection process, on the surface 62$a$ of the protection cover 62 (step S35; absence of foreign object) and proceeds to step S04.

Next, the foreign object detection device 10 outputs a power feeding instruction to the power transmitter 2 (control unit 16) to start power feeding to the power receiver 3 for the wireless power transfer (step S04). In addition, the power transmitter 2 starts power feeding to the power receiver 3, according to the power feeding instruction from the foreign object detection unit 43. At this time, in step S03, when power feeding at the time of the wireless power transfer is performed, the power transmitter 2 continuously perform the power feeding to the power receiver 3. In this way, the series of processes executed by the foreign object detection device 10 ends. In addition, the series of processes executed by the foreign object detection device 10 may be executed during the wireless power transfer. In addition, step S03 may be executed before step S02 and steps S02 and S03 may be executed in parallel, when the same detection coil 11 is not selected at the same time.

As such, in the foreign object detection device 10, for the combination of the two different detection coils 11 among the plurality of detection coils 11, a first foreign object determination process in which it is determined whether there is the electrically conductive foreign object or not according to whether the terminal A of one detection coil 11 and the terminal B of the other detection coil 11 are in the short circuit state or the open state is executed and a second foreign object determination process in which it is determined whether there is the electrically conductive foreign object or not according to the change in the amount of magnetic flux interlinking with the same detection coil 11 is executed. When there is the electrically conductive foreign object in the region surrounded by any detection coil 11 of the two different detection coils 11, the two detection coils 11 do not enter the short circuit state. Therefore, in the first foreign object determination process, the foreign object cannot be detected. However, the amount of magnetic flux interlinking with the detection coil 11 surrounding the foreign object changes from the amount of magnetic flux interlinking with the detection coil 11 when there is not the foreign object. For this reason, even when there is a foreign object not contacting the two or more detection coils 11, the foreign object can be detected by the second foreign object determination process. In addition, when there is the foreign object in a dead zone, the amount of magnetic flux interlinking with each of the detection coils 11 is almost equal to the amount of magnetic flux interlinking with each of the detection coils 11 when there is not the foreign object. For this reason, in the second foreign object determination process, the foreign object cannot be detected. However, when the foreign object contacts the two or more detection coils 11, the terminal A of one detection coil 11 of the detection coils 11 and the terminal B of other detection coil 11 enter the short circuit state. Therefore, the foreign object can be detected by the first foreign object determination process. As a result, detection precision of the foreign object can be improved.

When the terminal A and the terminal B of the same detection coil 11 are in the open state, it is considered that the detection coil 11 is physically disconnected. For this reason, it can be determined that there is the failure. In the case in which the detection coil 11 is disconnected, even though there is the foreign object contacting the disconnected detection coil 11 and other detection coil 11, it may be determined that the two detection coils 11 are in the open state. For this reason, in the first foreign object determination process, detection failure of the foreign object may occur. In addition, when the detection coil 11 is disconnected, an induced current does not flow to the detection coil 11. For this reason, in the second foreign object determination process, the foreign object may be erroneously detected. For example, when it is determined that the foreign object detection device 10 fails, the foreign object detection process is caused not to be executed, so that the erroneous detection and the detection failure of the foreign object can be prevented from occurring due to disconnection of the detection coil 11.

When the protection cover 62 is correctly attached to the base 61, each terminal of the detection coil 11 contacts the electrically conductive pad P and is electrically connected to any one of the conductive wires 12*a* to 12*t* via the electrically conductive pad P. Meanwhile, when the protection cover 62 is not correctly attached to the base 61, each terminal of the detection coil 11 does not contact the electrically conductive pad P and is not electrically connected to the conductive wires 12*a* to 12*t*. For this reason, when the protection cover 62 is correctly attached to the base 61 and the detection coil 11 is not physically disconnected, the terminal A and the terminal B of the detection coil 11 enter the short circuit state. When the protection cover 62 is not correctly attached to the base 61 or the detection coil 11 is physically disconnected, the terminal A and the terminal B of the detection coil 11 enter the open state. Therefore, when the terminal A and the terminal B of the same detection coil 11 are in the open state, it is considered that the detection coil 11 is physically disconnected or the protection cover 62 is not correctly attached to the base 61. For this reason, it can be determined that the foreign object detection device 10 fails. As a result, when it is determined that the foreign object detection device 10 fails, a user can be notified of that the protection cover 62 is not correctly attached to urge the protection cover 62 to be correctly attached to the base 61. In addition, the protection cover 62 is attached (closed) to the correct position, so that dust and water can be prevented from entering the accommodation space V of the housing 6, and the power transmission coil device 4 can be suppressed from failing due to a deviation of the protection cover 62.

In addition, when the detection coil 11 is physically disconnected or the protection cover 62 is not correctly attached to the base 61, the foreign object detection device 10 may not detect the foreign object accurately. For this reason, when it is determined that there is a failure, power feeding for the wireless power transfer is prohibited, so that the wireless power transfer in a state in which detection of the foreign object is not normally performed can be suppressed. If the protection cover 62 is not correctly attached to the base 61 and the dust, the water, etc. enter the power transmission coil device 4 from the outside, a circuit in the power transmission coil device 4 may fail. For this reason, when it is determined that there is the failure, power feeding for the wireless power transfer is prohibited, so that the wireless power transfer in a state in which the circuit does not function normally can be suppressed.

The embodiment of the present disclosure has been described. However, the present invention is not limited to the embodiment. For example, the number of detection coils 11 and the shape thereof are not limited to the number and the shape illustrated in FIG. 4. The number of detection coils 11 may be at least two. The shape of the coil portion C of the detection coil 11 is not limited to the rectangular shape and may be any shape capable of capturing the magnetic flux. For example, the shape of the coil portion C of the detection coil 11 may be a polygonal shape such as an annular shape, a triangular shape, and a pentagonal shape. The coil portions C of the plurality of detection coils 11 may have different sizes and shapes, respectively.

Figure 17:
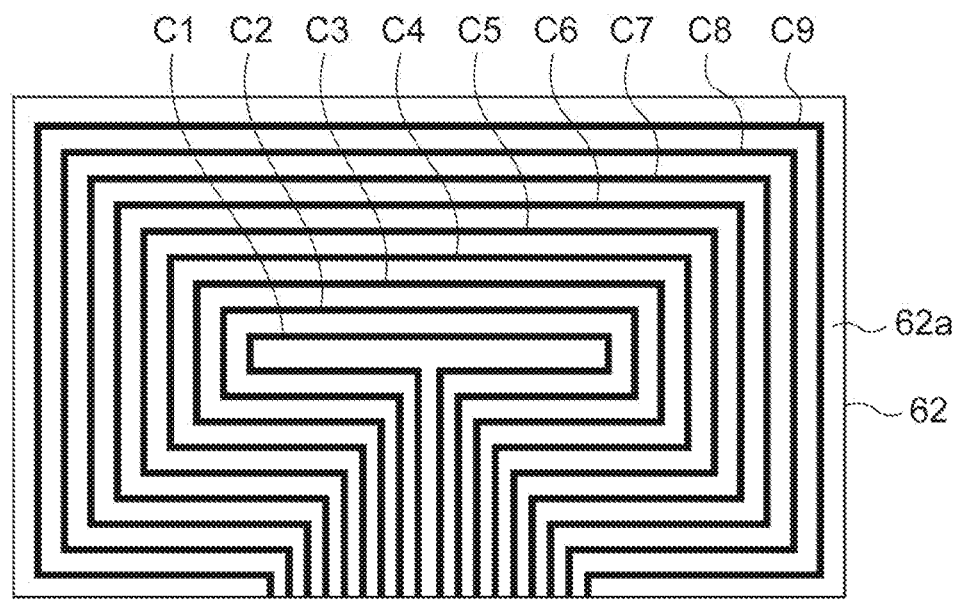
FIG. 17 is a diagram illustrating a different arrangement example of detection coils of FIG. 4.

For example, as illustrated in FIG. 17, the coil portion C1 may be disposed in the vicinity of the center of the surface 62*a* of the protection cover 62 and the coil portion C2 may be disposed to surround the coil portion C1. Each of the coil portions C3 to C9 may be arranged to surround the coil portion before each coil portion, in order of the coil portions C3 to C9. That is, the coil portion C9 may be provided along outer circumference of the surface 62*a* of the protection cover 62, the coil portion C8 slightly smaller than the coil portion C9 may be disposed in a region surrounded by the coil portion C9, the coil portion C7 slightly smaller than the coil portion C8 may be disposed in a region surrounded by the coil portion C8, and each of the coil portions C6 to C1 may be hereinafter disposed in a region surrounded by the coil portion before each coil portion, in order of the coil portions C6 to C1. In addition, a combined arrangement of the arrangement of FIG. 4 and the arrangement of FIG. 17 may be adopted. In addition, the detection coil 11 may be disposed on the lateral surface 62*c* of the protection cover 62. If a size of the coil portion C increases, detection sensitivity of the foreign object by the second foreign object detection process decreases. For this reason, the size of the coil portion C is determined according to the foreign object that is the detection target.

The switching unit 12 includes the first switching unit 21 and the second switching unit 22. However, the switching unit 12 may include one switching unit having the functions of the first switching unit 21 and the second switching unit 22. In addition, the switching unit 12 is accommodated in the accommodation space V of the housing 6. However, the switching unit 12 may be provided outside the housing 6. The measurement unit 13 includes the first measurement unit 31 and the second measurement unit 32. However, the measurement unit 13 may include one measurement unit having the functions of the first measurement unit 31 and the second measurement unit 32.

Figure 18A:
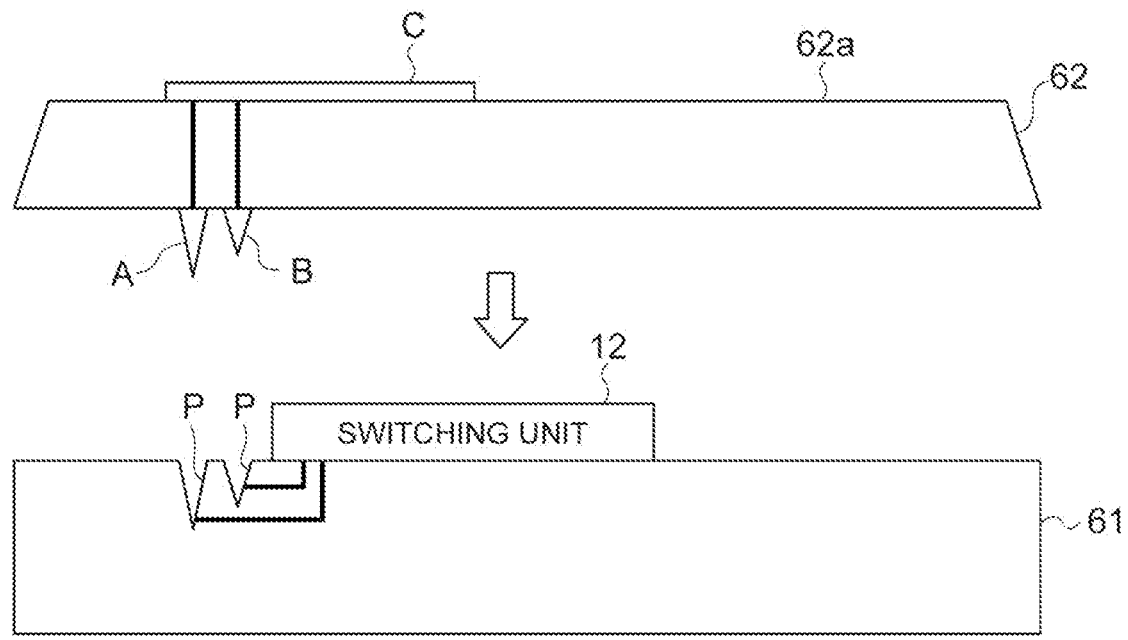
FIG. 18A is a diagram illustrating a different form of a base and a protection cover of a housing of a power transmission coil device of FIG. 1.
Figure 18B:
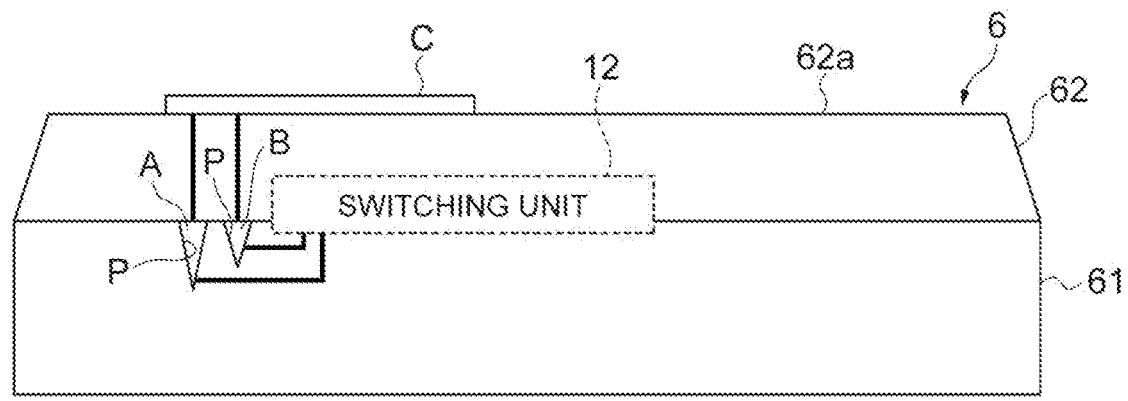
FIG. 18B is a diagram illustrating a state in which the protection cover is correctly attached to the base.

In addition, the shape of the electrically conductive pad P may be a circular shape. In addition, electric connection of the terminals A and B of the detection coil 11 and the input terminal of the switching unit 12 is not limited to the configuration illustrated in FIGS. 8A and 8B. For example, as illustrated in FIGS. 18A and 18B, the terminals A and B of the detection coil 11 may be formed as electrically conductive convex portions and the electrically conductive pads P provided in the leading edges of the conductive wires 12*a* to 12*t* of the switching unit 12 may be formed as concave portions. When the protection cover 62 is attached to the correct position of the base 61, the convex portion and the concave portion are fitted to each other. As a result, each terminal of the detection coil 11 is electrically connected to the conductive wires 12*a* to 12*t* of the switching unit 12. In addition, screw grooves may be provided in the convex portion and the concave portion. In this case, when the protection cover 62 is attached to the correct position of the base 61, the convex portion may be screwed to the concave portion and each terminal of the detection coil 11 may be electrically connected to the conductive wires 12*a* to 12*t* of the switching unit 12.

Figure 19:
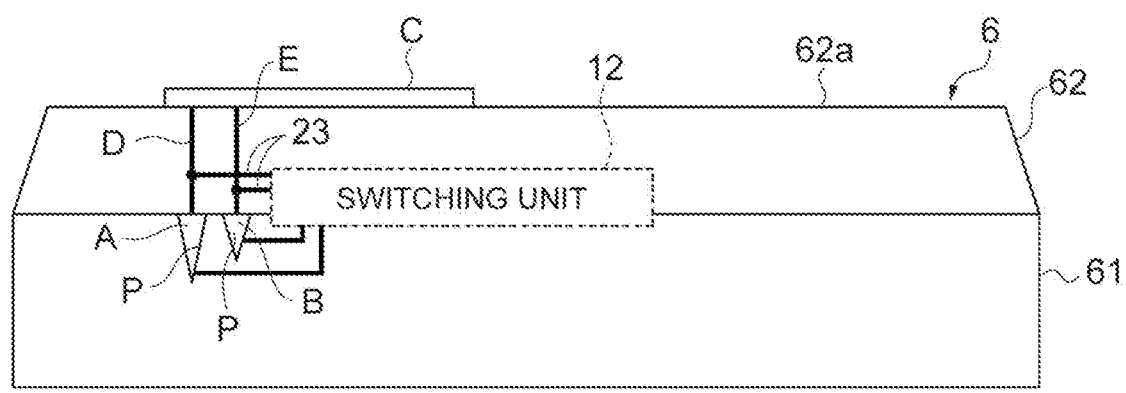
FIG. 19 is a diagram illustrating a different connection example of detection coils and a switching unit.

In addition, the detection coil 11 and the switching unit 12 are connected by the electrically conductive pad P. However, as illustrated in FIG. 19, the detection coil 11 and the switching unit 12 may be connected by a conductive wire portion 23 branched from each of the leader portion D and the leader portion E of the detection coil 11, in addition to the electrically conductive pad P. The switching unit 12 may connect each conductive wire portion 23 to a third switching unit different from the first switching unit 21 and the second switching unit 22 and the failure determination unit 42 may perform the opening/short circuit determination using the third switching unit. According to this configuration, the failure determination unit 42 can separately determine whether the protection cover 62 is attached to the correct position of the base 61 and whether there is disconnection in the conductive wire of the detection coil 11. In addition, the failure determination unit 42 can determine that the foreign object detection device 10 fails only when the detection coil 11 is disconnected.

In addition, the foreign object detection device 10 may not include the failure determination unit 42. That is, in the series of processes illustrated in FIG. 13, the failure diagnosis process of step SO1 can be omitted.

In the above description, the foreign object detection device 10 includes the control unit 14. However, the present invention is not limited to this aspect. For example, the control unit 16 of the power transmitter 2 may have the same function as the control unit 14 and the control unit 16 of the power transmitter 2 may control the switching unit 12 of the foreign object detection device 10. In addition, the control unit 16 performs the failure determination and the foreign object detection and controls power feeding of the power transmitter 2, on the basis of determination and detection results. In this case, each process illustrated in FIG. 13 is realized by the power transmission system 7 including the foreign object detection device 10 and the power transmitter 2. The control unit of the power receiver 3 instead of the power transmitter 2 may have the same function as the control unit 14 and the control unit of the power receiver 3 may control the switching unit 12 of the foreign object detection device 10. An exchange of a control signal between the power receiver 3 and the foreign object detection device 10 is realized by connecting both the devices by a signal line or providing wireless communication devices in both the devices.

Second Embodiment

Figure 20:
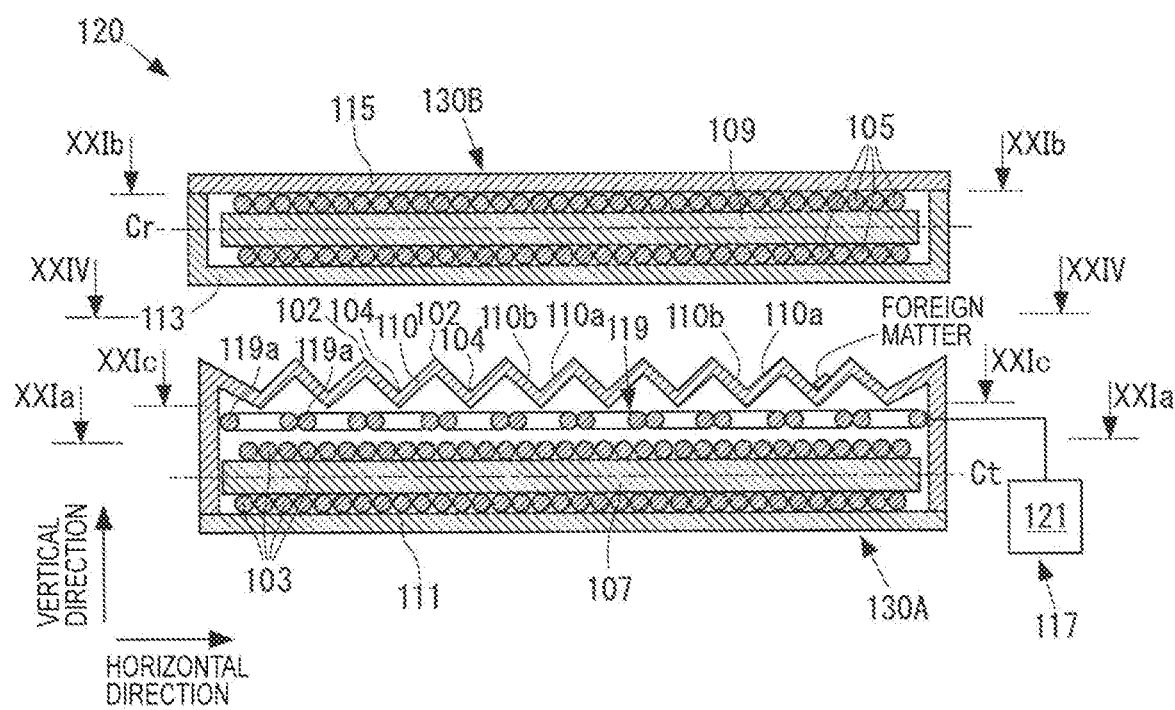
FIG. 20 is a diagram illustrating a configuration of a wireless power transfer system according to a second embodiment.
Figure 21A:
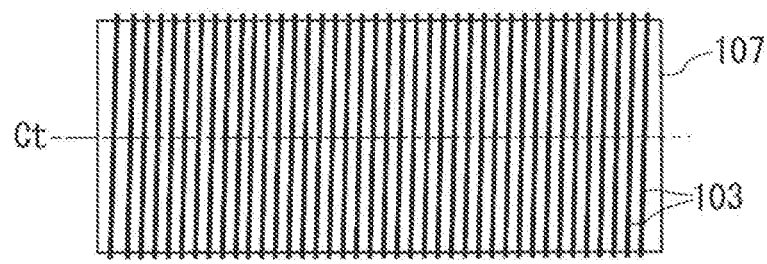
FIG. 21A is a diagram viewing from an arrow direction of the line XXIa-XXIa of FIG. 20.
Figure 21B:
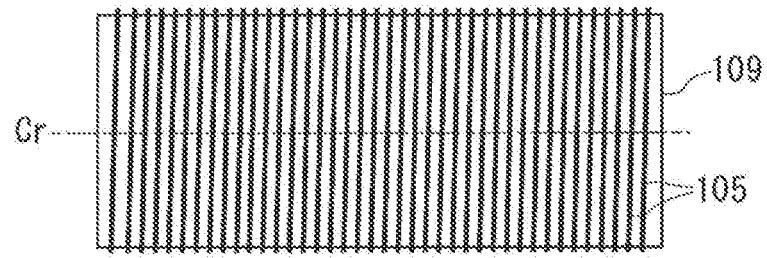
FIG. 21B is a diagram viewing from an arrow direction of the line XXIb-XXIb of FIG. 20.
Figure 21C:
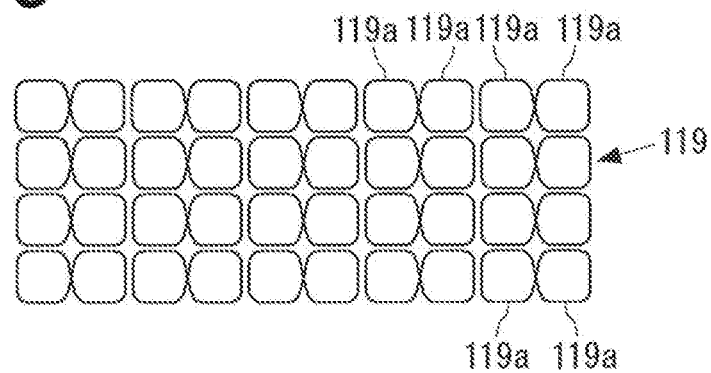
FIG. 21C is a diagram viewing from an arrow direction of the line XXIc-XXIc of FIG. 20.

FIG. 20 is a diagram illustrating a configuration of a wireless power transfer system according to a second embodiment. FIG. 20 is a cross-sectional view by a vertical plane of the wireless power transfer system. FIG. 21A is a diagram viewing from an arrow direction of the line XXIa-XXIa of FIG. 20 and illustrates only a power transmission coil 103 and a core 107. FIG. 21B is a diagram viewing from an arrow direction of the line XXIb-XXIb of FIG. 20 and illustrates only a power reception coil 105 and a core 109. FIG. 21C is a diagram viewing from an arrow direction of the line XXIc-XXIc of FIG. 20 and illustrates only a detection loop 119*a*.

A wireless power transfer system 120 of FIG. 20 includes a power transmission coil device 130A and a power reception coil device 130B. The power transmission coil device 130A includes power transmission coils 103 and a core 107 and the power reception coil device 130B includes power reception coils 105 and a core 109. The power transmission coil device 130A includes a cover 110 according to the second embodiment. In addition, the power transmission coil device 130A includes a coil supporter 111 that supports the power transmission coils 103.

One of the power transmission coils 103 and the power reception coils 105 corresponds to first coils and the other of the power transmission coils 103 and the power reception coils 105 corresponds to second coils.

The power transmission coils 103 transmit power to the power reception coils 105 wirelessly. When the power transmission coils 103 feed power to the power reception coils 105 wirelessly (hereinafter, simply referred to as at the time of wireless power transfer), as illustrated in FIG. 20, the power transmission coils 103 and the power reception coils 105 are disposed with a gap in a vertical direction. A center axis Ct of the power transmission coil 103 and a center axis Cr of the power reception coil 105 are oriented in a horizontal direction and are parallel to each other.

The power transmission coil 103 and the power reception coil 105 are conductive wires wound around the cores 107 and 109 formed of a magnetic material, respectively. In the second embodiment, each of the power transmission coil 103 and the power reception coil 105 is a solenoid type coil. In FIG. 20, each of the cores 107 and 109 has a plate shape. At the time of the wireless power transfer illustrated in FIG. 20, a top surface that is a widest surface among surfaces of the core 107 of the plate shape faces a bottom surface that is a widest surface among surfaces of the core 109 of the plate shape, in a vertical direction.

In the power transmission coil device 130A, a magnetic field shielding portion formed of a material (for example, aluminum) capable of shielding a magnetic field is provided. The magnetic field shielding portion covers the power transmission coil 103 from the lower side. In an example of FIG. 20, the coil supporter 111 is the magnetic field shielding portion.

The power reception coil 105 is covered with a cover 113 from the lower side. In FIG. 20, a coil supporting portion 115 formed of a material (for example, aluminum) capable of shielding a magnetic field is provided on an upward side of the power reception coil 105. The coil supporting portion 115 covers the power reception coil 105 from the upper side. The coil supporting portion 115 is attached to the cover 113 in the example of FIG. 20.

The cover 110 is provided to be located between the power transmission coil 103 and the power reception coil 105. The cover 110 covers an upper portion of one (in the example of FIG. 20, the power transmission coil 103) of the power transmission coil 103 and the power reception coil 105. That is, the cover 110 is provided in the coil supporter 111 supporting the coil (in this example, the power transmission coil 103) of the lower side in the power transmission coil 103 and the power reception coil 105 disposed to overlap each other in a vertical direction, to cover the upper portion of the coil of the lower side.

The power transmission coil device 130A includes a foreign object detection device 117 for a coil device according to the second embodiment.

The foreign object detection device 117 has a cover 110, foreign object detection coils 119, and a foreign object detection unit 121. The cover 110 may cover only the foreign object detection coils 119 in the foreign object detection coils 119 and the foreign object detection unit 121, as illustrated in FIG. 20, and may cover both the foreign object detection coils 119 and the foreign object detection unit 121, although not illustrated in the drawings. In addition, in this embodiment, because the power transmission coil device 130A includes the foreign object detection coils 119, the cover 110 of the power transmission coil device 130A and the cover 110 of the foreign object detection device 117 are integrated. In the example of FIG. 20, the cover 110 functions as both the cover of the power transmission coil device 130A and the cover of the foreign object detection device 117. If there is a foreign object on a top surface (facing surface facing the power reception coil 105) of the cover 110, a magnetic field generated by an alternating current (hereinafter, referred to as a current for power transmission) flowing through the power transmission coil 103 is disturbed. The foreign object detection device 117 determines whether there is the foreign object by detecting the disturbance.

The foreign object detection coils 119 are realized by one or more detection loops 119a. Each detection loop 119a is obtained by forming a conductive wire in a shape of a loop. In an example of FIG. 21C, the two detection loops 119a formed by disposing one conductive wire in a shape of 8 are configured as a pair and a plurality of pairs (20 pairs) of detection loops 119a are provided. The plurality of detection loops 119a are located at the side opposite to the magnetic field shielding portion (in FIG. 20, the coil supporter 111) of the power transmission coil device 130A, with respect to the power transmission coil 103. In addition, the plurality of detection loops 119a are located between the cover 110 and the power transmission coil 103. That is, the foreign object detection coil 119 is located between the power transmission coil 103 and the power reception coil 105.

By using the detection loops 119a, the foreign object is detected as follows. If a foreign object (for example, a coin, an iron nail, or the like) made of an electrically conductive material is placed on a top surface of the cover 110 (hereinafter, simply referred to as the cover top surface), magnetic flux penetrating the detection loop 119a changes. If the magnetic flux penetrates the detection loop 119a, the detection loop 119a outputs an electric signal (an induced voltage or an induced current) to the foreign object detection unit 121. However, an output signal from the detection loop 119a changes due to the change of the magnetic flux. The foreign object detection unit 121 detects the change and determines whether there is the foreign object on the cover top surface, on the basis of the change. For example, the foreign object detection unit 121 outputs a foreign object detection signal showing presence of the foreign object, on the basis of a current change of the detection loop 119a due to the change of the magnetic flux penetrating the detection loop 119a or a voltage change due to the current change. The foreign object detection unit 121 is a computer (controller) including a processor and a memory, for example. In addition, the foreign object detection unit 121 may not be a component of the foreign object detection device 117 and may be provided in the power transmission coil device 130A.

The top surface of the cover 110 includes inclined surfaces 110a and 110b. In the second embodiment, the inclined surfaces 110a and 110b are inclined to a coil plane of the power transmission coil 103. The coil plane of the power transmission coil 103 is a plane (horizontal plane) extending in parallel to a winding axis direction (that is, a direction of a center axis Ct) of a conductive wire configuring the power transmission coil 103 and corresponds to a widest surface among surfaces of the core 107 of the plate shape. In addition, the cover 110 is not limited to including the plurality of inclined surfaces and may include at least one inclined surface.

In addition, each detection loop 119a is disposed in parallel to the coil plane of the power transmission coil 103. In FIG. 20, each detection loop 119a is disposed in the same plane.

Each of the inclined surfaces 110a and 110b is a flat surface in FIG. 20, but may be a curved surface.

Figure 22A:
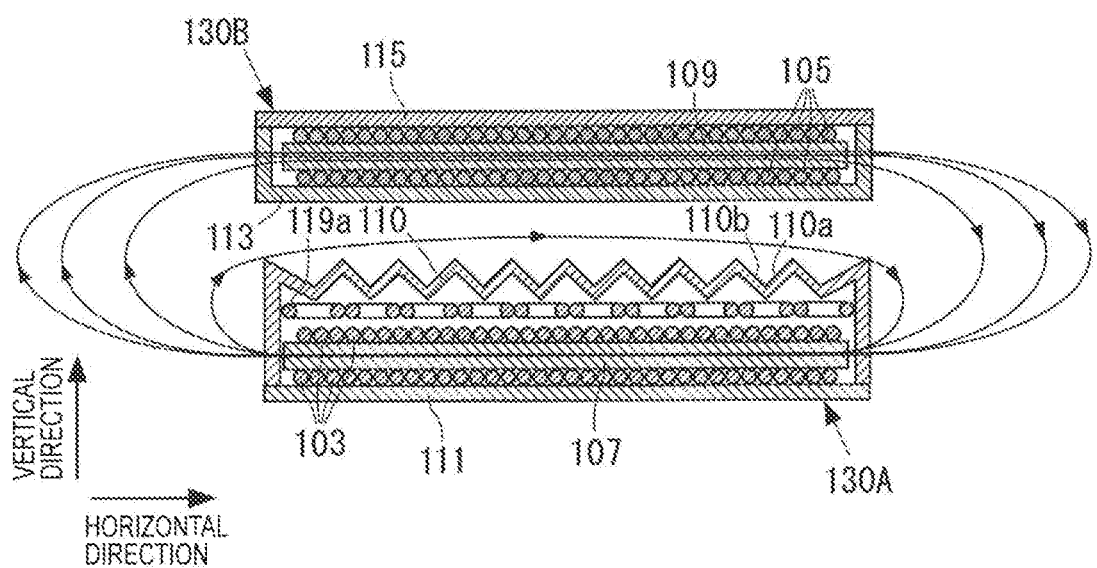
FIG. 22A is a diagram illustrating magnetic field lines generated by a current flowing through a power transmission coil.
Figure 22B:
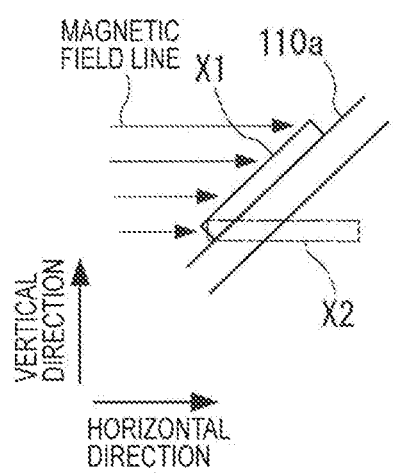
FIG. 22B is a partially enlarged view of FIG. 22A.

FIG. 22A is a diagram illustrating magnetic field lines generated by the current for the power transmission flowing through the power transmission coil 103, in the wireless power transfer system 120 of FIG. 20. FIG. 22B is a partially enlarged view of FIG. 22A.

When a foreign object (for example, a foreign object of a plate shape) is placed on the cover top surface, in many cases, the foreign object remains stationary in a state in which a widest surface having a largest area among surfaces of the foreign object contacts the cover top surface, from the viewpoint of stability. In this case, when the cover top surface is even, a smaller surface of the foreign object is oriented in a horizontal direction. In FIG. 22B, a foreign object X1 shown by a solid line remains stationary in a state in which a widest surface thereof contacts the inclined surface 110a. In FIG. 22B, a dashed line shows a foreign object X2 when the foreign object remains stationary in a state in which a widest surface thereof contacts the horizontal cover top surface. The foreign object X1 and the foreign object X2 are the same. As illustrated in FIG. 22A, directions of magnetic field lines become approximate to a horizontal direction, in the vicinity of the cover 110. For this reason, when the cover 110 does not have the inclined surface 110a, magnetic flux (in FIG. 22B, one magnetic field line) interlinks with a small surface of the foreign object X2. The cover 110 has the inclined surface 110a, so that the magnetic flux interlinks with a large surface of the foreign object X1 (in the foreign object, an interlinkage area of the magnetic flux can be increased). In FIG. 22B, four magnetic field lines interlink with the foreign object X1. As such, because the number of magnetic field lines interlinking with the foreign object increases, a change of the magnetic flux interlinking with the detection loop 119a is increased by the foreign object. As a result, precision of detection of the foreign object by the foreign object detection device 117 (detection loop 119a) is improved.

Even when a rod-shaped foreign object is placed on the inclined surfaces 110a and 110b, the number of magnetic field lines penetrating the foreign object becomes larger than the number of magnetic field lines penetrating the foreign object when the foreign object is placed on the horizontal cover top surface. Therefore, for the rod-shaped foreign object, precision of detection of the foreign object by the foreign object detection device 117 (detection loop 119a) is improved by the inclined surfaces 110a and 110b.

Figure 23A:
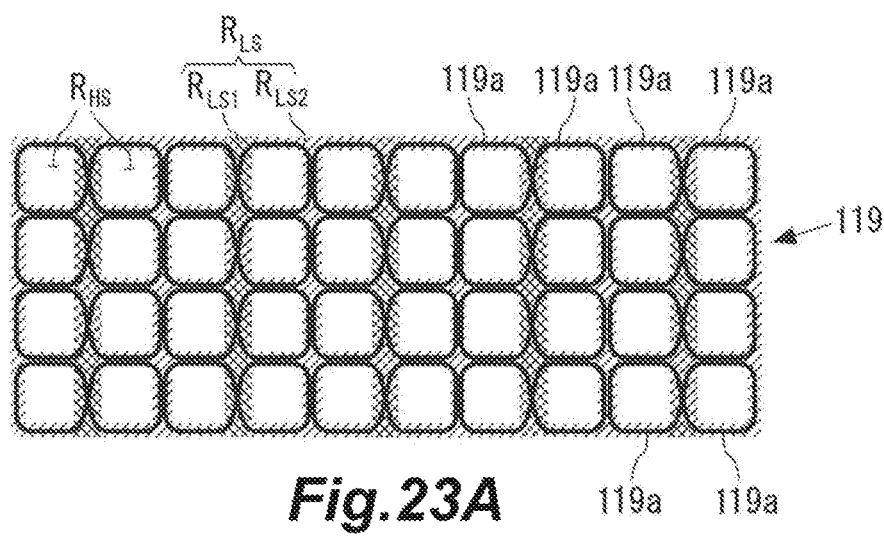
FIG. 23A is a diagram illustrating a low sensitivity region and a high sensitivity region of a foreign object detection coil.
Figure 23B:
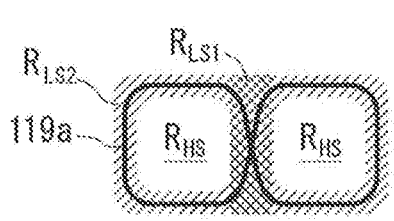
FIG. 23B is a partially enlarged view of FIG. 23A.
Figure 23C:
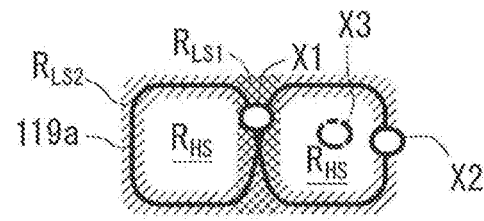
FIG. 23C is a diagram illustrating a state in which the foreign object is placed on the cover top surface of FIG. 23B.

FIG. 23A is a diagram illustrating a low sensitivity region $R_{LS}$ where detection sensitivity by the detection loop 119a is relatively lower and a high sensitivity region $R_{HS}$ where the detection sensitivity by the detection loop 119a is relatively higher, in FIG. 21C. FIG. 23B is a partially enlarged view of FIG. 23A and illustrates a pair of detection loops 119a formed using one conductive wire. FIG. 23C is a diagram illustrating a state in which the foreign object is placed on the cover top surface, in FIG. 23B.

In the second embodiment, the inclined surfaces 110a and 110b are inclined downward from the low sensitivity region $R_{LS}$ where the detection sensitivity by the detection loop 119a is relatively lower to the high sensitivity region $R_{HS}$ where the detection sensitivity by the detection loop 119a is relatively higher.

As the low sensitivity region $R_{LS}$, there are a first low sensitivity region $R_{LS1}$ and a second low sensitivity region $R_{LS2}$.

The first low sensitivity region $R_{LS1}$ overlaps a meshy region in FIGS. 23A and 23B in a direction (vertical direction) of a center axis of each detection loop 119a. That is, when viewed from the direction of the center axis of each detection loop 119a, the first low sensitivity region $R_{LS1}$ is a boundary between the detection loops 119a to which currents cancelled at the time of penetration of the magnetic flux of the same direction (for example, a direction toward a top side of a plane of paper from a back side of the plane of paper in FIGS. 23A and 23B) flow, among a plurality (for example, an even number) of detection loops 119a formed using one conductive wire, or the boundary and a surrounding portion thereof. The presence of the low sensitivity region is also described in Patent Literature 2.

The second low sensitivity region $R_{LS2}$ overlaps a hatching region in FIGS. 23A and 23B in the direction (in FIG. 24, a vertical direction) of the center axis of each detection loop 119a. That is, the second low sensitivity region $R_{LS2}$ overlaps the conductive wire configuring the detection loop 119a in the direction (in FIGS. 23A and 23B, a direction vertical to the plane of paper) of the center axis of the detection loop 119a. However, when there is the first low sensitivity region $R_{LS1}$, the second low sensitivity region $R_{LS2}$ is a region except for the first low sensitivity region $R_{LS1}$.

The high sensitivity region $R_{HS}$ overlaps an inner region of each detection loop 119a in the direction of the center axis of the detection loop 119a.

As illustrated in FIG. 23C, when there is the foreign object X1 in the first low sensitivity region $R_{LS1}$, a position of the foreign object X1 is a boundary of the detection loops 119a adjacent to each other or a surrounding portion thereof, when viewed from the direction of the center axis of the detection loop 119a. For this reason, the foreign object X1 has almost the same influence on the magnetic flux penetrating the detection loop 119a. Therefore, a current change of the detection loop 119a by the influence is also cancelled and the foreign object may not be detected.

As illustrated in FIG. 23C, an influence which the foreign object X2 has on the magnetic flux penetrating the detection loop 119a when there is the foreign object X2 (foreign object X2 shown by the solid line) in the second low sensitivity region $R_{LS2}$ is smaller than an influence which the foreign object X3 has on the magnetic flux penetrating the detection loop 119a when there is the same foreign object (foreign object X3 shown by a dashed line) in the high sensitivity region $R_{HS}$. Therefore, when there is the foreign object in the second low sensitivity region $R_{LS2}$, detection precision of the foreign object is lowered as compared with when there is the foreign object in the high sensitivity region $R_{HS}$.

Figure 24:
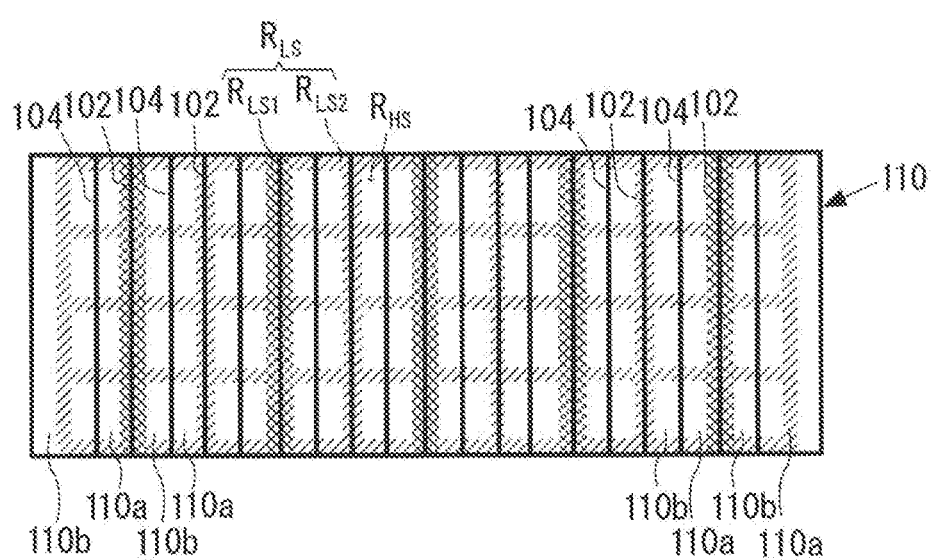
FIG. 24 is a diagram viewing from an arrow direction of the line XXIV-XXIV of FIG. 20.

FIG. 24 is a diagram viewing from an arrow direction of the line XXIV-XXIV of FIG. 20. In FIG. 24, a meshy region is the first low sensitivity region $R_{LS1}$ and a hatching region is the second low sensitivity region $R_{LS2}$.

In a configuration example of FIG. 24, the individual inclined surfaces 110a and 110b are inclined downward in a direction (horizontal direction) of a center axis Ct of the power transmission coil 103, from the first low sensitivity region $R_{LS1}$ to the high sensitivity region $R_{HS}$ adjacent to the first low sensitivity region $R_{LS1}$ in a horizontal direction (direction of the center axis Ct) of FIG. 24. More specifically, each inclined surface 110a is inclined in a left downward direction of FIG. 20, from a top portion 102 extending linearly in a direction vertical to the plane of paper of FIG. 20 to a bottom portion 104 extending linearly in the direction vertical to the plane of paper of FIG. 20. Each inclined surface 110b is inclined in a right downward direction of FIG. 20, from a top portion 102 extending linearly in a direction vertical to the plane of paper of FIG. 20 to a bottom portion 104 extending linearly in the direction vertical to the plane of paper of FIG. 20. Each top portion 102 is located in the low sensitivity region $R_{LS}$ and each bottom portion 104 is located in the high sensitivity region $R_{HS}$. In addition, each top portion 102 is shared between the inclined surfaces 110a and 110b adjacent to each other and each bottom portion 104 is shared between the inclined surfaces 110a and 110b adjacent to each other.

According to the configuration example of FIG. 24, when the foreign object is placed on the inclined surfaces 110a and 110b at a position where there is the high sensitivity region $R_{HS}$ in the horizontal direction of FIG. 24 in the first or second low sensitivity region $R_{LS1}$ or $R_{LS2}$, the foreign object moves to the high sensitivity region $R_{HS}$ along the inclined surface 110a or 110b by the self weight and remains stationary in the bottom portion 104 of the high sensitivity region $R_{HS}$ or a surrounding portion of the bottom portion 104.

In FIG. 20, when the foreign object is placed on each of the inclined surfaces 110a and 110b, magnetic field lines (magnetic flux) interlinking with the foreign object increases, as illustrated in FIG. 22B. Therefore, if the foreign object remains stationary in the high sensitivity region $R_{HS}$ in a state in which the foreign object is placed on any one of the inclined surfaces 110a and 110b, detection precision of the foreign object is further improved.

In addition, in FIG. 20, the top surface of the cover 110 has the multiple inclined surfaces 110a and 110b of different directions and the inclined surfaces 110a and 110b form (regular) multiple uneven portions (the top portions 102 and the bottom portions 104) on the top surface of the cover 110. As a result, when a heavy thing (for example, a person) is displaced on the top surface of the cover 110, force acting on the cover 110 is dispersed. Therefore, strength of the cover 110 increases.

Third Embodiment

Figure 25A:
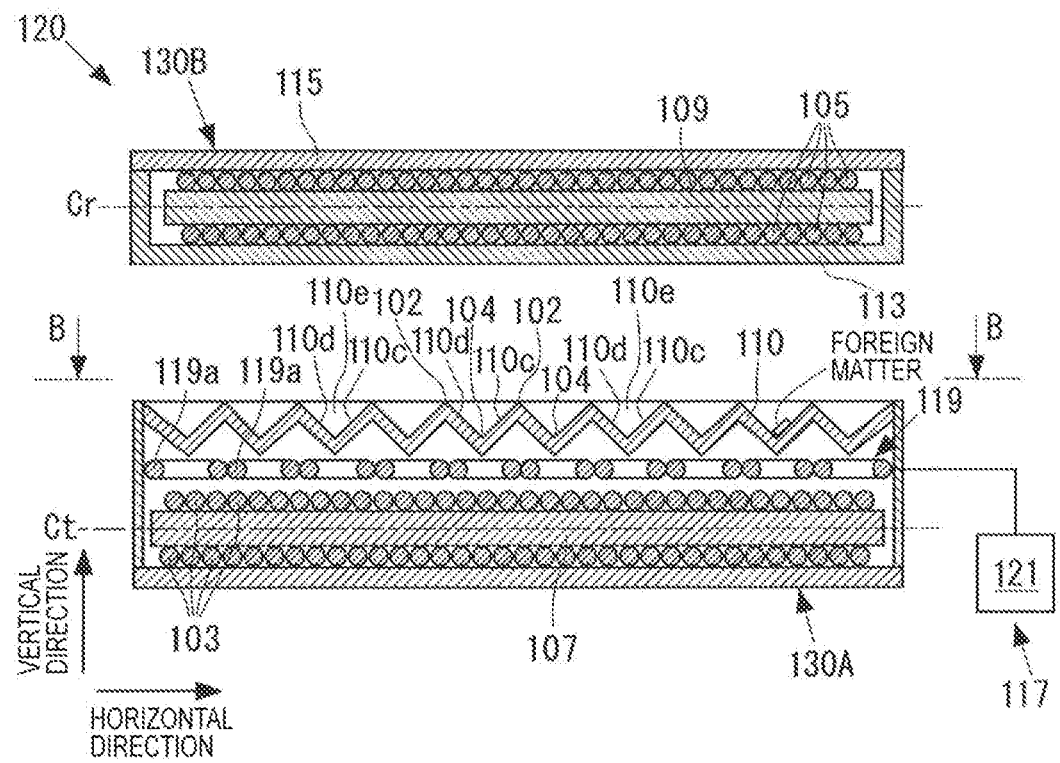
FIG. 25A is a diagram illustrating a configuration of a wireless power transfer system according to a third embodiment.

FIG. 25A is a diagram illustrating a foreign object detection device 117 and a power transmission coil device 130A according to a third embodiment. FIG. 25A is a cross-sectional view by a vertical plane of a wireless power transfer system according to the third embodiment. In the third embodiment, points not described below are the same as the points in the case of the second embodiment described above.

Figure 25B:
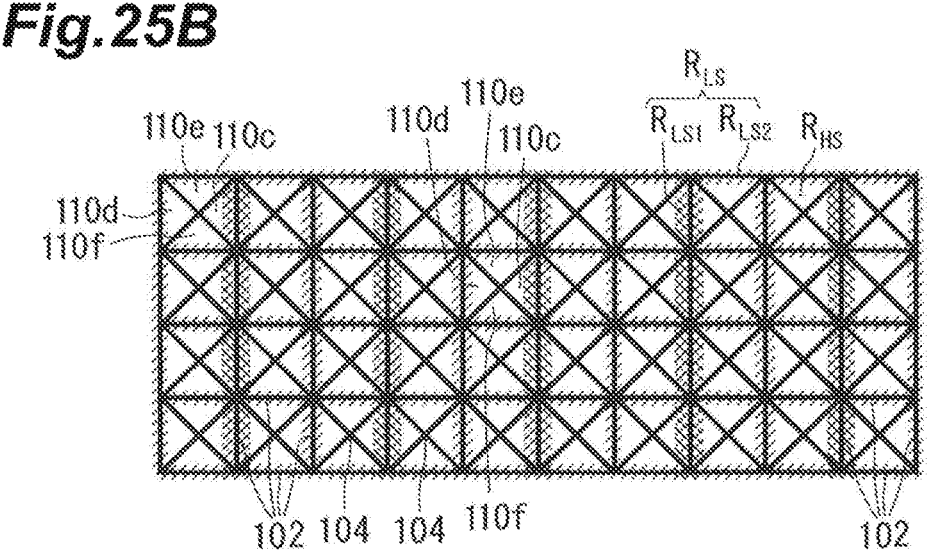
FIG. 25B is a diagram viewing from an arrow direction of the line B-B of FIG. 25A.

FIG. 25B is a diagram viewing from an arrow direction of the line B-B of FIG. 25A. In FIG. 25B, a meshy region is a first low sensitivity region $R_{LS1}$ and a hatching region is a second low sensitivity region $R_{LS2}$. As illustrated in FIG. 25B, a top portion 102 is provided almost right above a boundary between detection loops 119a adjacent to each other and is located in a low sensitivity region $R_{LS}$. A plurality of top portions 102 are provided on a plane (horizontal plane) parallel to a coil plane and include top portions 102 extending along a direction of a center axis Ct and top portions 102 extending along a direction orthogonal to the direction of the center axis Ct.

In FIGS. 25A and 25B, four inclined surfaces 110c, 110d, 110e, and 110f are configured as a set and each of the inclined surfaces 110c, 110d, 110e, and 110f included in each set is provided at a position overlapping an inner region of one detection loop 119a corresponding to the inclined surfaces, in a direction (in FIG. 25A, a vertical direction) of a center axis of the detection loop 119a. That is, the inner region of the detection loop 119a is surrounded by the two top portions 102 adjacent to each other in the direction of the center axis Ct and the two top portions 102 adjacent to each other in the direction orthogonal to the direction of the center axis Ct. In each set, each of the inclined surfaces 110c, 110d, 110e, and 110f is inclined downward from the top portion 102 extending linearly in a horizontal direction to a bottom portion 104 on the center axis of the detection loop 119a. Each of the inclined surfaces 110c, 110d, 110e, and 110f has a triangular shape when viewed from the direction (in FIG. 25A, the vertical direction) of the center axis of the detection loop 119a, as illustrated in FIG. 25B.

In each set described above, in an example of FIG. 25A, the inclined surface 110c is inclined downward from the right top portion 102 to the left bottom portion 104 in FIG. 25B, the inclined surface 110d is inclined downward from the left top portion 102 to the right bottom portion 104 in FIG. 25B, the inclined surface 110e is inclined downward from the upper top portion 102 to the lower bottom portion 104 in FIG. 25B, and the inclined surface 110f is inclined downward from the lower top portion 102 to the upper bottom portion 104 in FIG. 25B.

According to the third embodiment, even when a foreign object is placed on any inclined surfaces 110c, 110d, 110e, and 110f of the cover top surface, the foreign object is guided to the bottom portion 104 of the high sensitivity region $R_{HS}$ along the inclined surfaces 110c, 110d, 110e, and 110f by the self weight and remains stationary in the bottom portion 104. Therefore, even when the foreign object is placed on any inclined surfaces 110c, 110d, 110e, and 110f of the cover top surface, the foreign object can be detected with high sensitivity.

In addition, as illustrated in FIG. 25B, the entire top surface of the cover 110 is formed using multiple sets of inclined surfaces 110c, 110d, 110e, and 110f without a gap, without leaving a space between the sets adjacent to each other.

In FIGS. 25A and 25B, the top surface of the cover 110 has the inclined surfaces 110c, 110d, 110e, and 110f of the different directions and these inclined surfaces form (regular) multiple uneven portions (the top portions 102 and the bottom portions 104) on the top surface of the cover 110. As a result, strength of the cover 110 increases.

Fourth Embodiment

Figure 26A:
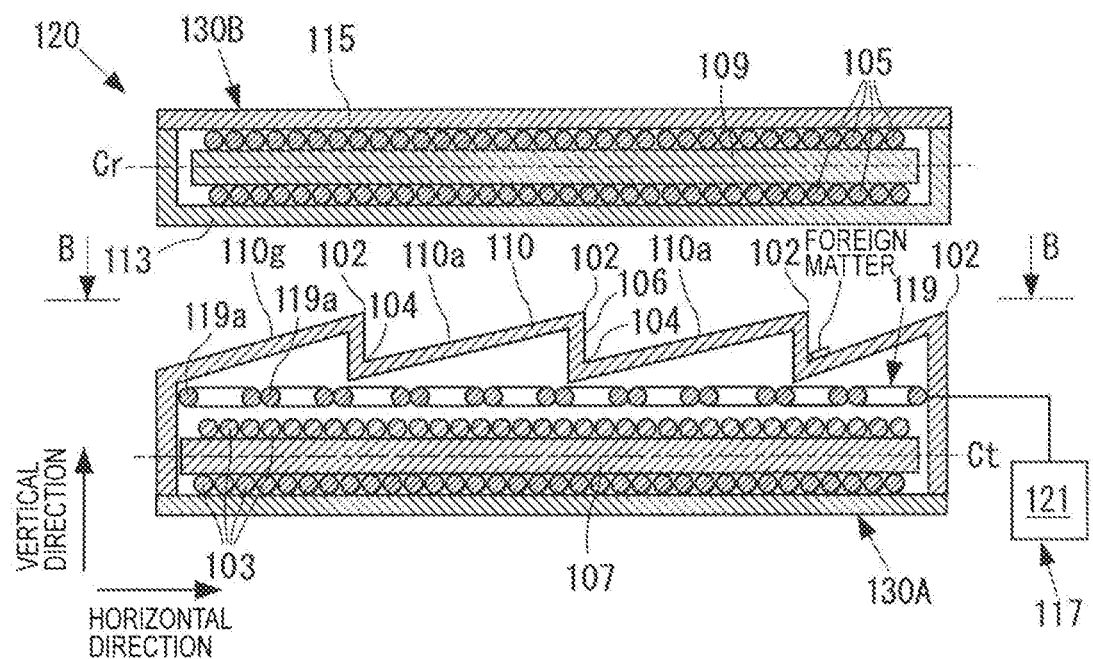
FIG. 26A is a diagram illustrating a configuration of a wireless power transfer system according to a fourth embodiment.

FIG. 26A is a diagram illustrating a configuration of a wireless power transfer system according to a fourth embodiment. FIG. 26A is a cross-sectional view by a vertical plane of the wireless power transfer system according to the fourth embodiment. In the fourth embodiment, points not described below are the same as the points in the case of the second embodiment described above.

Figure 26B:
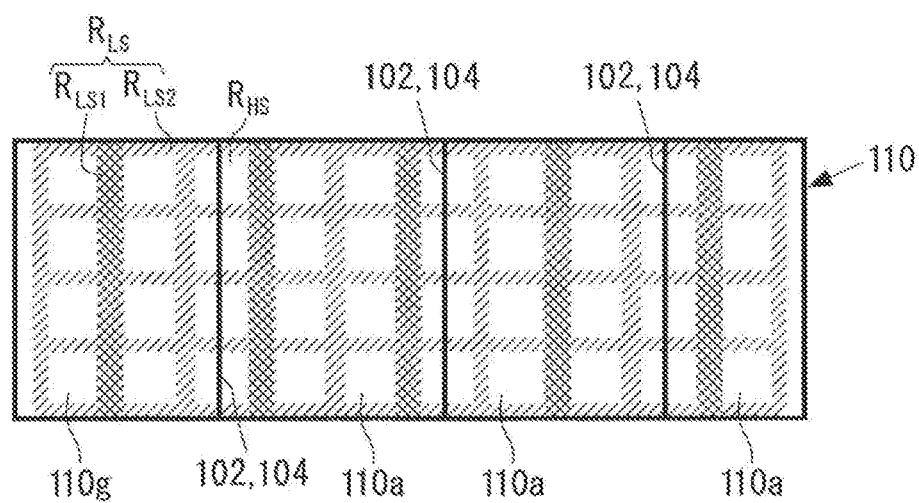
FIG. 26B is a diagram viewing from an arrow direction of the line B-B of FIG. 26A.

FIG. 26B is a diagram viewing from an arrow direction of the line B-B of FIG. 26A. In FIG. 26B, a meshy region is a first low sensitivity region $R_{LS1}$ and a hatching region is a second low sensitivity region $R_{LS2}$.

In the fourth embodiment, each inclined surface 110a is inclined in a left downward direction of FIG. 26A, from a top portion 102 extending linearly in a direction vertical to a plane of paper of FIG. 26A to a bottom portion 104 extending linearly in the direction vertical to the plane of paper of FIG. 26A. Each inclined surface 110a is inclined downward with respect to a direction (leftward direction of FIG. 26A) of a center axis Ct of a power transmission coil 103 to straddle one detection loop 119a or a plurality of detection loops 119a. That is, a dimension of each inclined surface 110a in the direction of the center axis Ct is larger than a dimension of one detection loop 119a in the direction of the center axis Ct or is larger than a sum of dimensions of the plurality of detection loops 119a in the direction of the center axis Ct. In the inclined surfaces 110a adjacent to each other, a top portion 102 of one inclined surface 110a and a bottom portion 104 of the other inclined surface 110a are coupled by a vertical surface 106.

In the fourth embodiment, a top surface of a cover 110 of a power transmission coil device 130A includes an end inclined surface 110g that is inclined to a coil plane of the power transmission coil 103. The end inclined surface 110g is inclined downward from the top portion 102 located at an end in the direction of the center axis Ct in the plurality of top portions 102 to an end of the top surface of the cover 110. The end inclined surface 110g is opened in a horizontal direction in an oblique lower end (left end of FIG. 26A) thereof. Therefore, a foreign object placed on the end inclined surface 110g can be moved in an obliquely downward direction on the end inclined surface 110g by the self weight thereof and can be dropped from the left end of FIG. 26A in the end inclined surface 110g.

Figure 27:
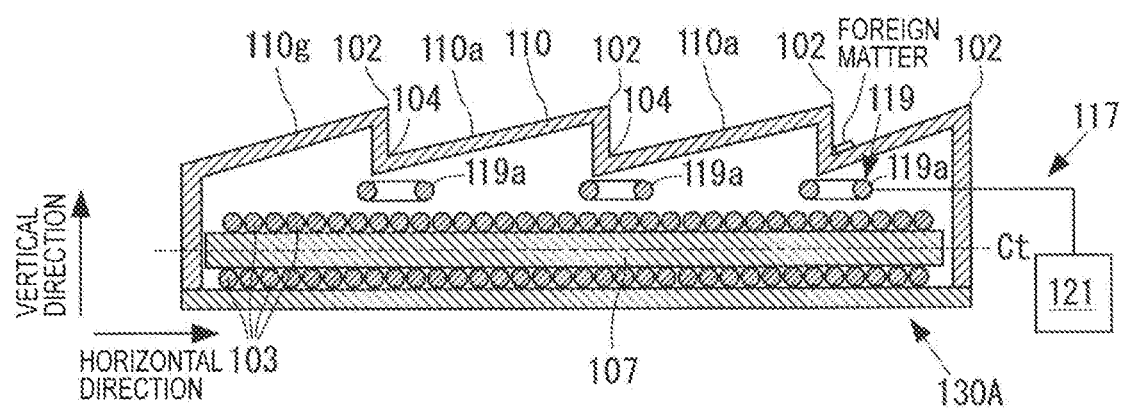
FIG. 27 is a diagram illustrating a different configuration example of a wireless power transfer system according to a fourth embodiment.

FIG. 27 is a diagram illustrating another configuration example of the wireless power transfer system according to the fourth embodiment. In a configuration illustrated in FIG. 27, some detection loops 119a are omitted in the power transmission coil device 130A of FIG. 26A.

In the fourth embodiment, as illustrated in FIG. 27, the detection loops 119a other than the detection loop 119a overlapping the bottom portion 104 of each inclined surface 110a when viewed from a vertical direction may be omitted. For example, the detection loop 119a may be provided at only a position overlapping the bottom portion 104 of each inclined surface 110a, when viewed from the vertical direction.

Even in the fourth embodiment, when the foreign object is placed on the inclined surface 110a, the foreign object moves to a high sensitivity region $R_{HS}$ along the inclined surface 110a by the self weight and remains stationary in the bottom portion 104 of the high sensitivity region $R_{HS}$. Therefore, the foreign object can be detected with high precision.

Fifth Embodiment

Figure 28A:
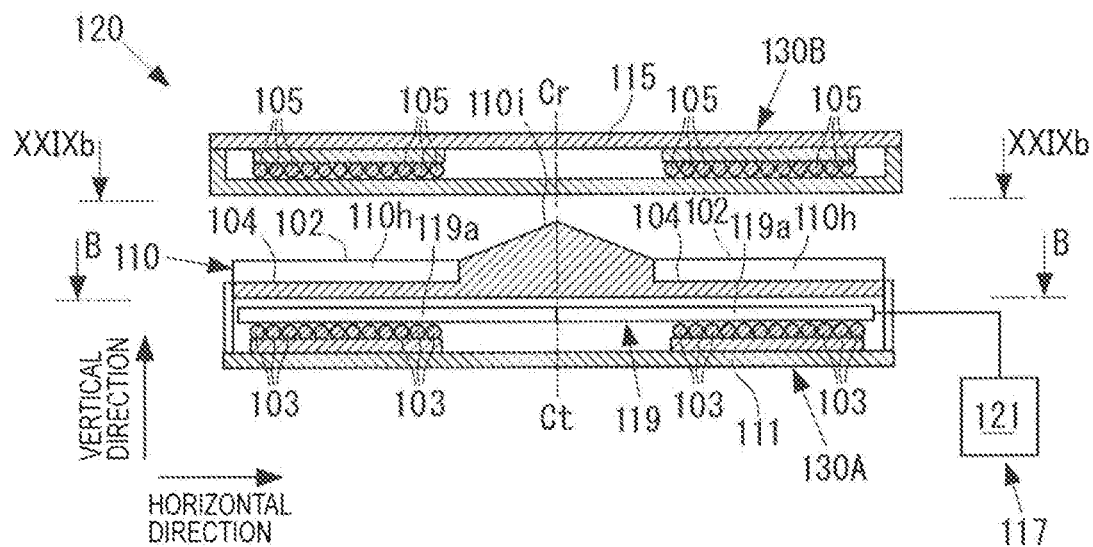
FIG. 28A is a diagram illustrating a configuration of a wireless power transfer system according to a fifth embodiment.
Figure 28B:
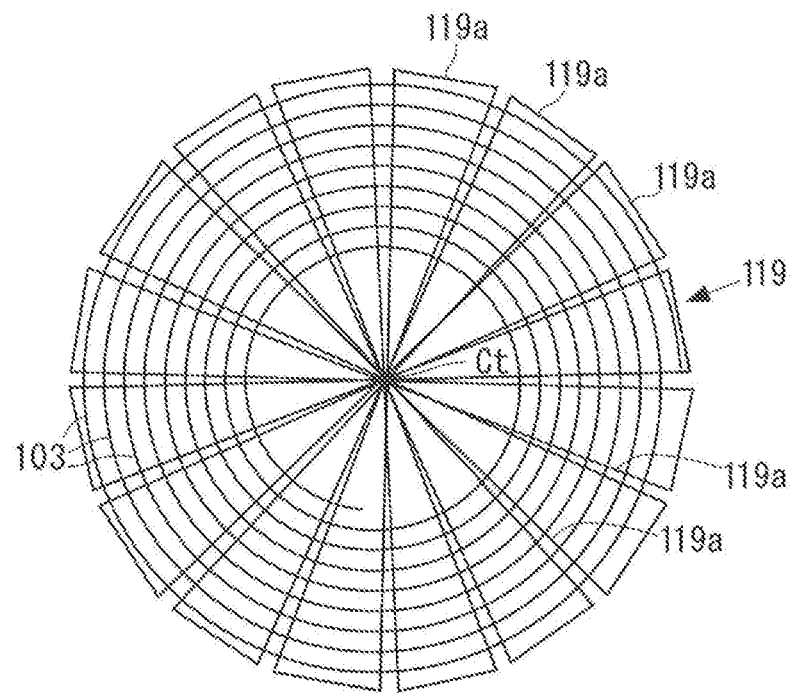
FIG. 28B is a diagram viewing from an arrow direction of the line B-B of FIG. 28A.
Figure 28C:
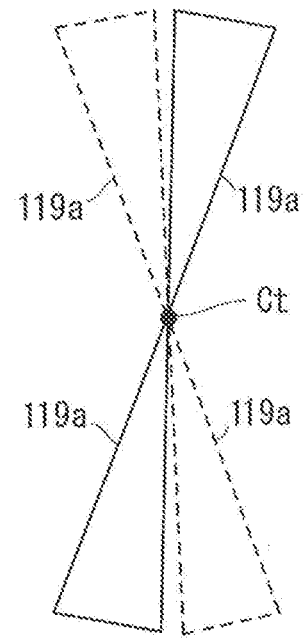
FIG. 28C is a diagram illustrating only a part of the plurality of detection loops in FIG. 28B.

FIG. 28A is a diagram illustrating a configuration of a wireless power transfer system according to a fifth embodiment. FIG. 28A is a cross-sectional view by a vertical plane of the wireless power transfer system according to the fifth embodiment. FIG. 28B is a diagram viewing from an arrow direction of the line B-B of FIG. 28A and illustrates only power transmission coils 103 and detection loops 119a. FIG. 28C is a diagram illustrating only a part of the plurality of detection loops 119a in FIG. 28B. In the fifth embodiment, points not described below are the same as the points in the case of the second embodiment described above.

In the fifth embodiment, each of the power transmission coil 103 and a power reception coil 105 is a conductive wire of a spiral shape. For example, each of the power transmission coil 103 and the power reception coil 105 is formed in the spiral shape in the same plane.

As illustrated in FIGS. 28B and 28C, the two detection loops 119a formed by disposing one conductive wire in approximately a shape of 8 is configured as a pair and a plurality of pairs (8 pairs) of detection loops 119a are provided. In FIG. 28C, a solid line shows a pair of detection loops 119a and a broken line shows another pair of detection loops 119a and illustration of the other pairs of detection loops 119a is omitted. In each pair of detection loops 119a, the two detection loops 119a are point-symmetrical with each other when viewed from a direction of a center axis Ct, as illustrated in FIGS. 28B and 28C. Here, a center of the point symmetry is located on the center axis Ct or in the vicinity of the center axis Ct. However, the arrangement and the shape of the detection loop 119a are not limited to an example of FIG. 28A and are arbitrary.

FIG. 29A is a diagram illustrating magnetic field lines by a current for power transmission flowing through the power transmission coil 103 in the wireless power transfer system of FIG. 28A. FIG. 29B is a diagram viewing from an arrow direction of the line XXIXb-XXIXb of FIG. 29A and FIG. 29C is a cross-sectional view taken along the line C-C of FIG. 29B.

In the fifth embodiment, a coil plane of the power transmission coil 103 is a plane (in FIG. 28A, a horizontal plane) orthogonal to the center axis Ct of the power transmission coil 103. According to the fifth embodiment, a top surface of a cover 110 includes inclined surfaces 110*h* inclined to the coil plane of the power transmission coil 103.

A low sensitivity region $R_{LS}$ is a hatching portion of FIG. 29B. Similar to the second embodiment, when viewed from a direction of a center axis of each detection loop 119*a*, as shown by the hatching portion of FIG. 29B, a boundary between detection loops 119*a* included in each pair in FIG. 28B or the boundary and a surrounding portion (that is, in this embodiment, a surrounding region of the center axis Ct) thereof are the low sensitivity region $R_{LS}$. In addition, when viewed from the direction of the center axis of each detection loop 119*a*, as shown by the hatching portion of FIG. 29B, in a horizontal circumferential direction around the center axis Ct, a boundary between the detection loops 119*a* adjacent to each other in FIG. 28B or the boundary and a surrounding portion thereof are the low sensitivity region $R_{LS}$.

The inclined surface 110*h* is inclined downward from the low sensitivity region $R_{LS}$ (hatching portion of FIG. 29B) where detection sensitivity by the detection loop 119*a* is relatively lower to a high sensitivity region $R_{HS}$ where the detection sensitivity by the detection loop 119*a* is relatively higher. The low sensitivity region $R_{LS}$ overlaps a conductive wire forming each detection loop 119*a* in the direction of the center axis of the detection loop 119*a*. The high sensitivity region $R_{HS}$ overlaps an inner portion of each detection loop 119*a* in the direction of the center axis of the detection loop 119*a*.

In the fifth embodiment, each inclined surface 110*h* is inclined to the side (in FIG. 29A, the lower side) of the power transmission coil 103 with respect to the horizontal circumferential direction around the center axis Ct, from a top portion 102 located in the low sensitivity region $R_{LS}$ to a bottom portion 104 located in the high sensitivity region $R_{HS}$. Each top portion 102 and each bottom portion 104 extend linearly in a direction (radial direction) of a radius with respect to the center axis Ct. Each top portion 102 is shared between the inclined surfaces 110*h* adjacent to each other. The inclined surfaces 110*h* adjacent to each other extend to the sides opposite to each other, from the shared top portion 102 to a separate bottom portion 104.

In the fifth embodiment, as illustrated in FIG. 28A, the top surface of the cover 110 includes an inclined surface 110*i* inclined to the coil plane of the power transmission coil 103. The inclined surface 110*i* is a conical surface with the center axis Ct as an axis. If a foreign object is placed on the inclined surface 110*i*, the foreign object is guided to the outside of the radial direction where the high sensitivity regions $R_{HS}$ are present with a space in the circumferential direction. That is, the conical surface of the inclined surface 110*i* has a top located on the center axis Ct and the inclined surface 110*i* is inclined downward from the low sensitivity region $R_{LS}$ of the top to the outside of the radial direction where the high sensitivity regions $R_{HS}$ are present with the space in the circumferential direction.

Sixth Embodiment

A sixth embodiment is different from the second to fifth embodiments in that a power transmission coil device 130A further has a vibration device 123 to vibrate a cover 110.

Figure 30:
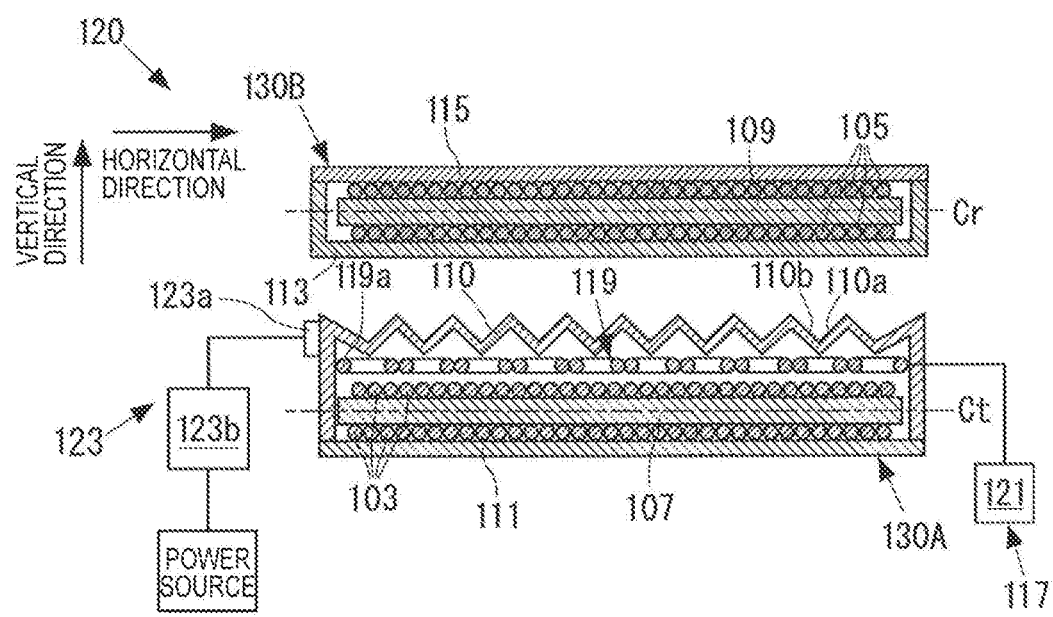
FIG. 30 is a diagram illustrating a configuration of a wireless power transfer system according to a sixth embodiment.

FIG. 30 is a diagram illustrating a configuration of a wireless power transfer system according to the sixth embodiment. A wireless power transfer system 120 illustrated in FIG. 30 has a configuration in which the vibration device 123 is provided in the wireless power transfer system 120 according to the second embodiment illustrated in FIG. 20. Hereinafter, description is given on the basis of FIG. 30. However, this is the same in a configuration in which the vibration device 123 is provided in the wireless power transfer system 120 according to the third to fifth embodiments.

The vibration device 123 has a vibration generation mechanism (for example, an eccentric motor) 123*a* and a switch 123*b*. The vibration generation mechanism 123*a* is attached to a cover 110. The switch 123*b* is switched between a closing state in which power is supplied from a power source to the vibration generation mechanism 123*a* and an open state in which the power is not supplied from the power source to the vibration generation mechanism 123*a*. The switch 123*b* is switched manually or automatically.

When the switch 123*b* is switched manually, an operation unit to switch the switch 123*b* between the closing state and the open state is provided. A person operates the operation unit (a button or a lever), so that the switch 123*b* is switched between the closing state and the open state.

When the switch 123*b* is switched automatically, the switch 123*b* is switched automatically from the open state to the closing state, at the time of starting to supply a current to a power transmission coil 103. For example, an operation unit to start to supply the current to the power transmission coil 103 is provided. The person operates the operation unit (a button or a lever), so that supplying of a current for power transmission to the power transmission coil 103 starts and the switch 123*b* is switched automatically from the open state to the closing state. As such, the switch 123*b* is configured.

According to the sixth embodiment, if power is supplied to the vibration generation mechanism 123*a* attached to the cover 110, the vibration generation mechanism 123*a* vibrates and the cover 110 vibrates. As a result, a foreign object on a cover top surface can be moved to a bottom portion 104 more surely or can be dropped from the cover top surface.

Seventh Embodiment

A seventh embodiment is different from the fourth embodiment in that detection loops 119*a* are disposed in parallel to inclined surfaces.

Figure 31A:
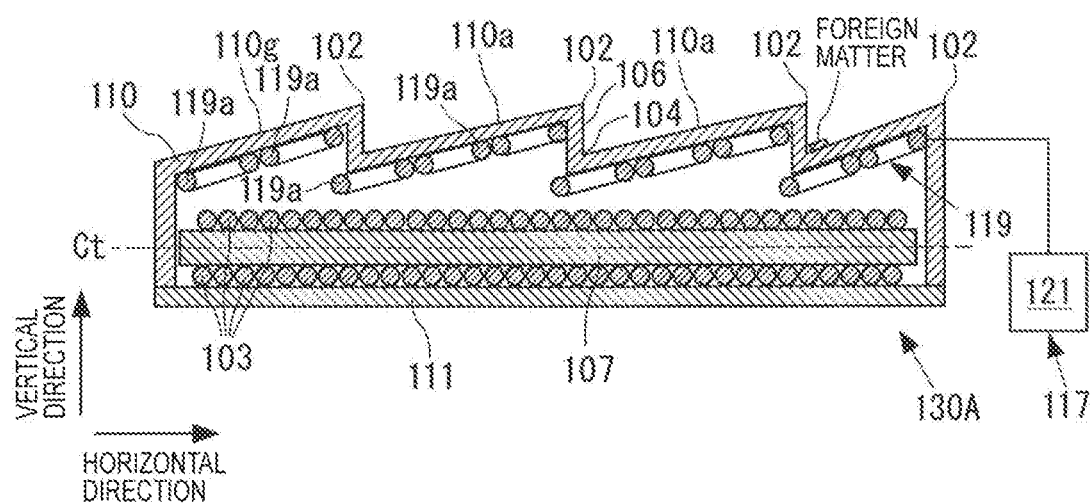
FIG. 31A is a diagram illustrating a configuration of a wireless power transfer system according to a seventh embodiment.
Figure 31B:
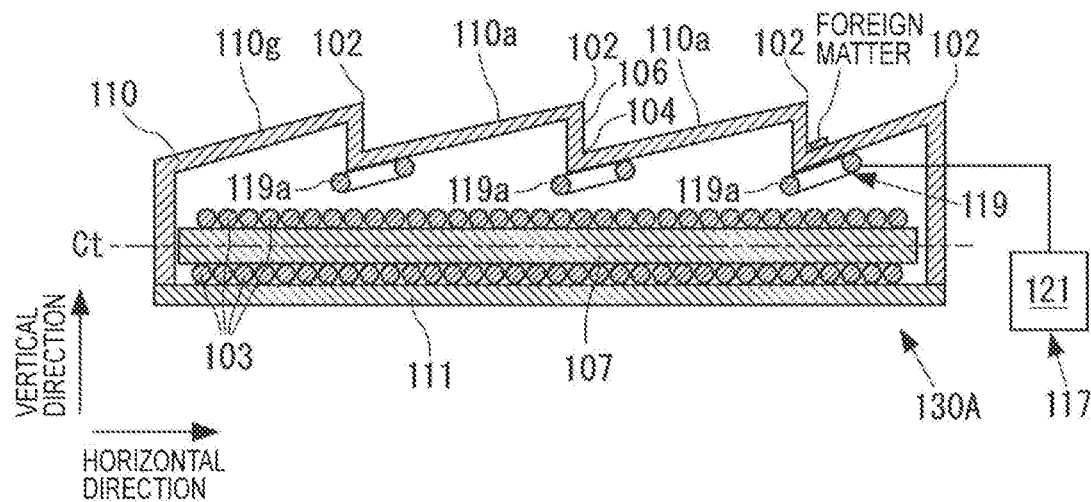
FIG. 31B is a diagram illustrating a configuration in which each detection loop is disposed in parallel to the inclined surface in the power transmission coil device of FIG. 27.
Figure 32:
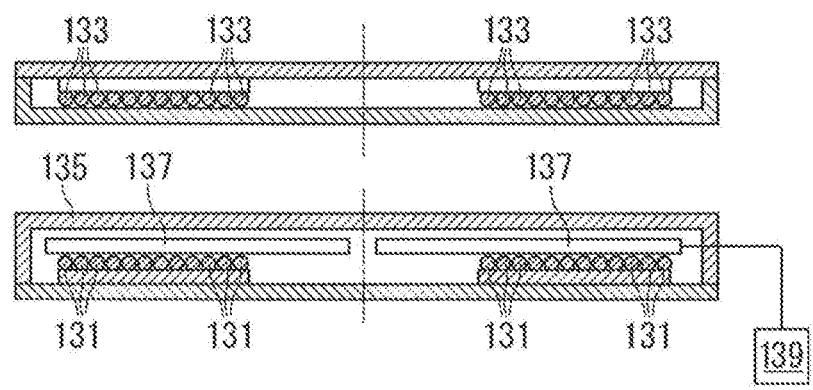
FIG. 32 is a diagram illustrating a configuration of a wireless power transfer system according to the related art.
Figure 33:
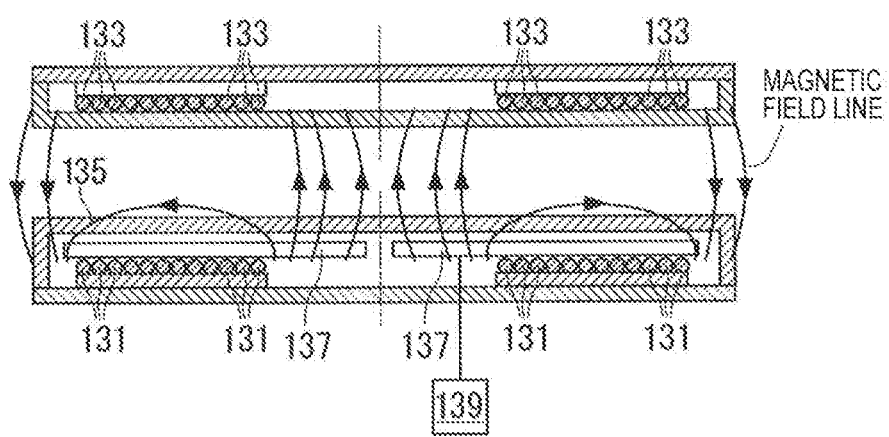
FIG. 33 is a diagram illustrating magnetic field lines in a wireless power transfer system of FIG. 32.

FIG. 31A is a diagram illustrating a configuration of a wireless power transfer system according to the seventh embodiment. FIG. 31A is a diagram illustrating a configuration in which each detection loop 119*a* is disposed in parallel to an inclined surface 110*a* in a power transmission coil device 130A illustrated in FIG. 26A. FIG. 31B is a diagram illustrating a configuration in which each detection loop 119*a* is disposed in parallel to the inclined surface 110*a* in a power transmission coil device 130A illustrated in FIG. 27. As illustrated in FIG. 31A, each detection loop 119*a* (plane orthogonal to a center axis of the detection loop 119*a*) is disposed in parallel to the inclined surface 110*a* or an end inclined surface 110*g* overlapping the detection loop 119*a* in a vertical direction. As illustrated in FIG. 31B, each detection loop 119*a* is disposed in parallel to the inclined surface 110*a* overlapping the detection loop 119*a* in the vertical direction.

According to the seventh embodiment, a distance between a foreign object placed on the inclined surface and the detection loop 119*a* can be decreased. Therefore, a change of magnetic flux penetrating the detection loop 119*a* is increased by the foreign object on the inclined surface and detection precision by the detection loop 119*a* is improved.

The present invention is not limited to the embodiments described above and various changes can be made without departing from the scope of the present invention. For example, any one of the following first to third modifications may be adopted and any combination of at least two of the following first to third modifications may be adopted. In this case, the other point is the same as the above.

First Modification

In the second to seventh embodiments, the power transmission coil 103 is located below the power reception coil 105 and the cover 110 is provided to cover the power transmission coil 103 from the upper side. However, the power reception coil 105 may be located below the power transmission coil 103 and the cover 110 may be provided to cover the power reception coil 105 from the upper side. In this case, the contents of the second to seventh embodiments and the contents of the individual drawings are applied by switching the positions of the power transmission coil 103 and the power reception coil 105. Therefore, one of the power transmission coil 103 and the power reception coil 105 is set as a first coil and the other of the power transmission coil 103 and the power reception coil 105 is set as a second coil and the coil device according to the present disclosure includes the second coil to transmit power to the first coil wirelessly or receive power from the first coil wirelessly.

Second Modification

In the second to seventh embodiments, the cover 110 of the power transmission coil device 130A is integrated with the cover 110 of the foreign object detection device 117. However, the present invention is not limited to this aspect. For example, the power transmission coil device 130A and the foreign object detection device 117 may be realized by separate devices. In this case, the foreign object detection device 117 (foreign object detection coil 119) is disposed on an upward side of the power transmission coil device 130A or the top surface of the cover 110 of the power transmission coil device 130A.

Third Modification

The configurations of the second to seventh embodiments and the individual drawings are only exemplary. The technology of the present disclosure can be applied to various position relations among the power transmission coil, the power reception coil, and the foreign object detection coil. That is, the inclined surfaces included on the top surface of the cover 110 may be inclined downward from the low sensitivity region where the detection sensitivity of the foreign object detection coil is relatively lower to the high sensitivity region where the detection sensitivity of the foreign object detection coil is relatively higher.

REFERENCE SIGNS LIST

1 wireless power transfer system
2 power transmitter
3 power receiver
4 power transmission coil device
5 power reception coil device
6 housing
7 power transmission system
10 foreign object detection device
11 detection coil
12 switching unit (selector)
13 measurement unit
14 control unit (controller)
16 control unit (controller)
21 first switching unit
22 second switching unit
31 first measurement unit
32 second measurement unit
41 switching control unit
42 failure determination unit
43 foreign object detection unit
61 base
62 protection cover
62*a* surface
A, A1 to A10 terminal
B, B1 to B10 terminal
C, C1 to C10 coil portion
102 top portion
103 power transmission coil
104 bottom portion
105 power reception coil
106 vertical surface
107 core
109 core
110 cover
110*a*, 110*b*, 110*c*, 110*d*, 110*e*, 110*f*, 110*g*, 110*h*, 110*i* inclined surface
111 coil supporter
113 cover
115 coil supporting portion
117 foreign object detection device
119 foreign object detection coil
119*a* detection loop
120 wireless power transfer system
121 foreign object detection unit
123 vibration device
123*a* vibration generation mechanism
123*b* switch
130A power transmission coil device
130B power reception coil device

The invention claimed is:

1. A power transmission system including a power transmitter including a coil device used for wireless power transfer and a foreign object detection device for the coil device, the power transmission system comprising:

first and second detection coils configured to be disposed on a casing of the coil device, each of the first and second detection coils including two terminals;

a selector configured to select one of one terminal of the first detection coil and one terminal of the second detection coil as a first terminal and select one of the other terminal of the first detection coil and the other terminal of the second detection coil as a second terminal; and a controller configured to perform a first foreign object determination process that causes the selector to select the one terminal of the first detection coil as the first terminal and the other terminal of the second detection coil as the second terminal to determine whether there is an electrically conductive foreign object depending on whether connection between the first terminal and the second terminal is in a short circuit state or an open state, and to perform a second foreign object determination process that causes the selector to select the two terminals of the same detection coil from either the first detection coil and the second detection coil as the first terminal and the second terminal to determine whether there is the foreign object depending on a change in an amount of magnetic flux interlinking with the same detection coil.

2. The power transmission system according to claim 1, wherein
the controller causes the selector to select the two terminals of the same detection coil as the first terminal and the second terminal and determines whether there is a failure according to whether the connection between the first terminal and the second terminal is in the short circuit state or the open state.

3. The power transmission system according to claim 2, wherein
the casing includes a cover and a base defining an accommodation space to accommodate the coil device,
the selector includes a plurality of input terminals and each of the plurality of input terminals corresponds to one of the terminals of the first detection coil and the second detection coil,
the first detection coil and the second detection coil are provided in the cover, and
each terminal of the first detection coil and the second detection coil is electrically connected to the input terminal corresponding to each terminal by the cover being attached to the base.

4. The power transmission system according to claim 2, wherein
the controller controls the power transmitter such that power feeding for wireless power transfer is prohibited, when it is determined that there is the failure.

5. The power transmission system according to claim 1, wherein
the controller controls the power transmitter such that power feeding for wireless power transfer is prohibited or lower power than at the time of the wireless power transfer is fed, when it is determined that there is the electrically conductive foreign object.

6. The power transmission system according to claim 1, wherein
the foreign object detection device includes the first detection coil, the second detection coil, and the selector, and
the power transmitter includes the controller.

7. The power transmission system according to claim 1, wherein
the foreign object detection device includes the first detection coil, the second detection coil, the selector, and the controller.

8. A foreign object detection device for a coil device used for wireless power transfer from a power transmitter, the foreign object detection device comprising:
first and second detection coils configured to be disposed on a casing of the coil device, each of the first and second detection coils including two terminals;
a selector configured to select one of one terminal of the first detection coil and one terminal of the second detection coil as a first terminal and select one of the other terminal of the first detection coil and the other terminal of the second detection coil as a second terminal; and
a controller configured to perform a first foreign object determination process that causes the selector to select the one terminal of the first detection coil as the first terminal and the other terminal of the second detection coil as the second terminal to determine whether there is an electrically conductive foreign object depending on whether connection between the first terminal and the second terminal is in a short circuit state or an open state, and to perform a second foreign object determination process that causes the selector to select the two terminals of the same detection coil from either the first detection coil and the second detection coil as the first terminal and the second terminal to determine whether there is the foreign object depending on a change in an amount of magnetic flux interlinking with the same detection coil.

* * * * *